Aug. 19, 1969  D. H. LUXTON  3,461,571
TEACHING SYSTEM

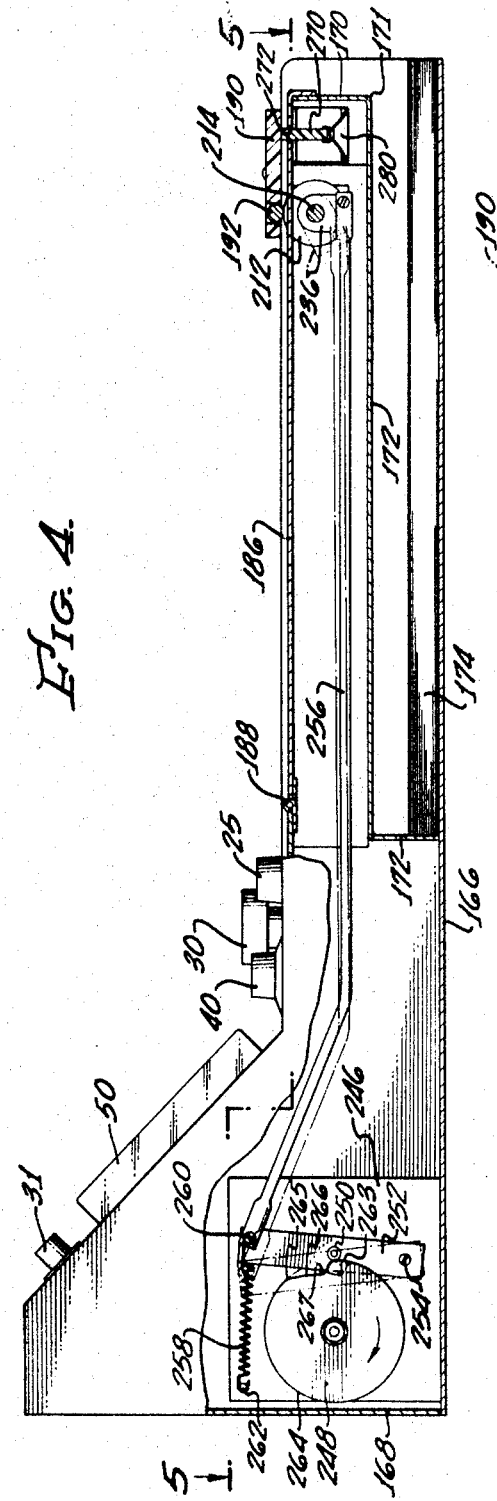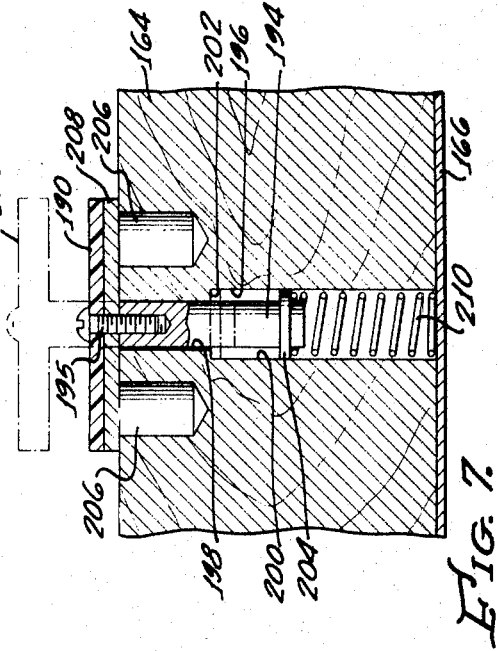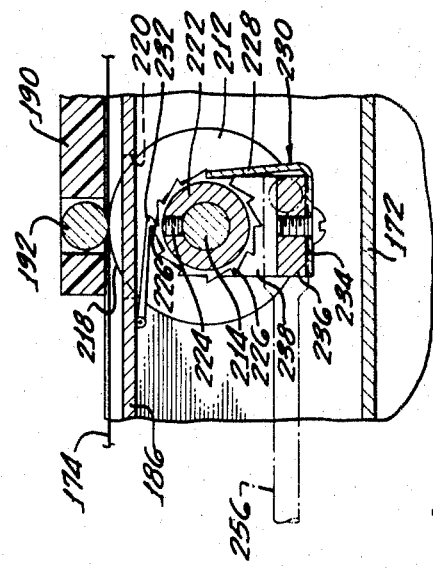
INVENTOR.
DEAN H. LUXTON
BY FOWLER, KNOBBE
& GAMBRELL
ATTORNEYS.

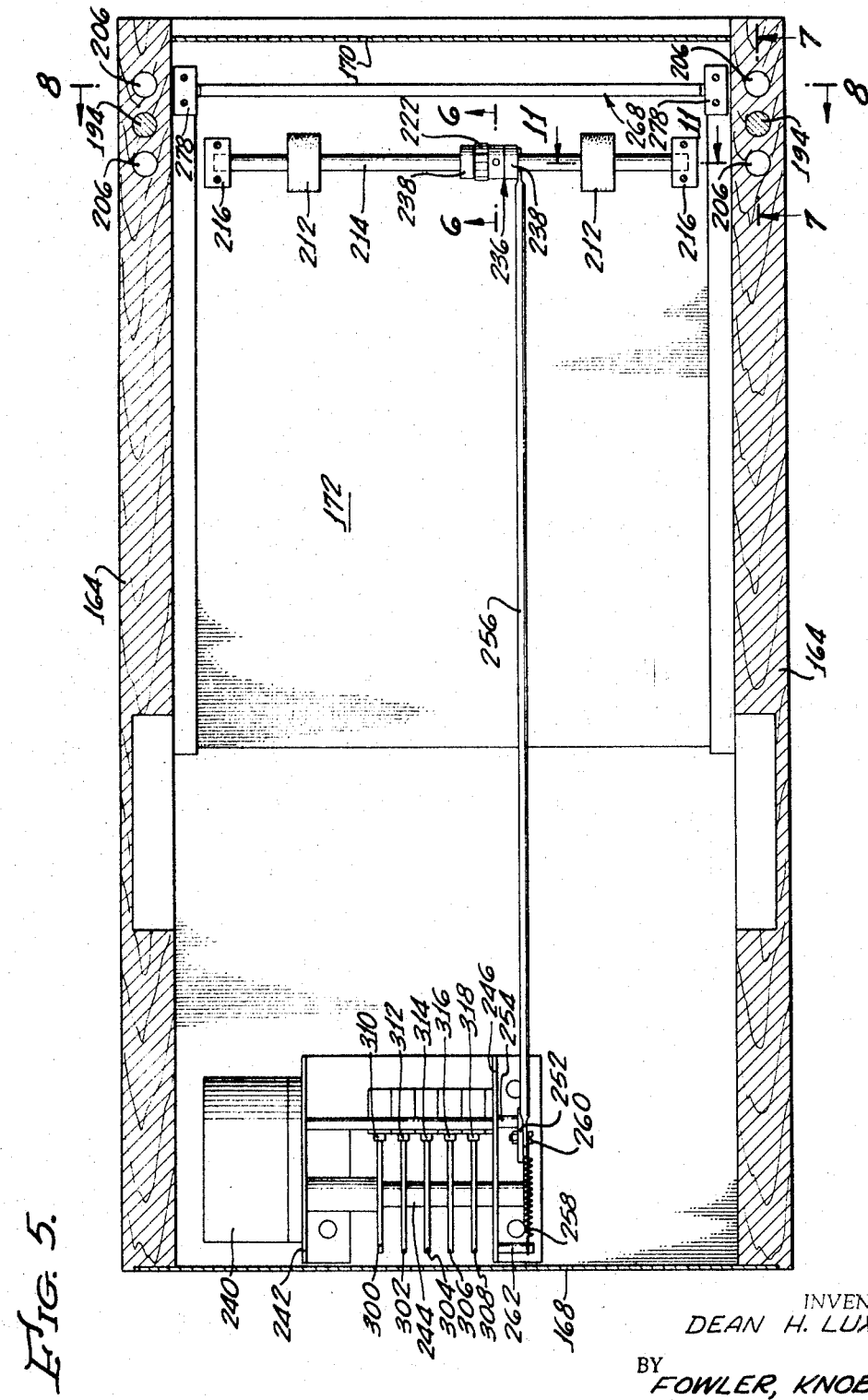

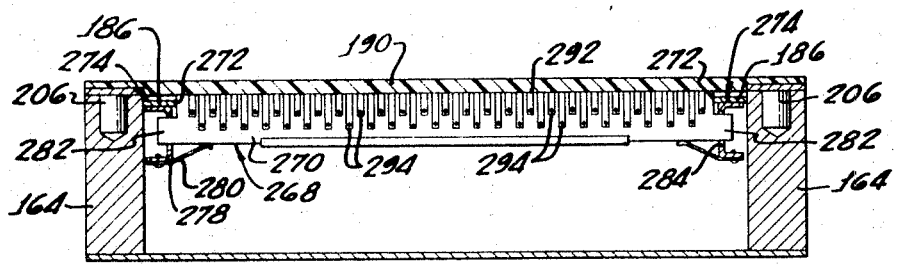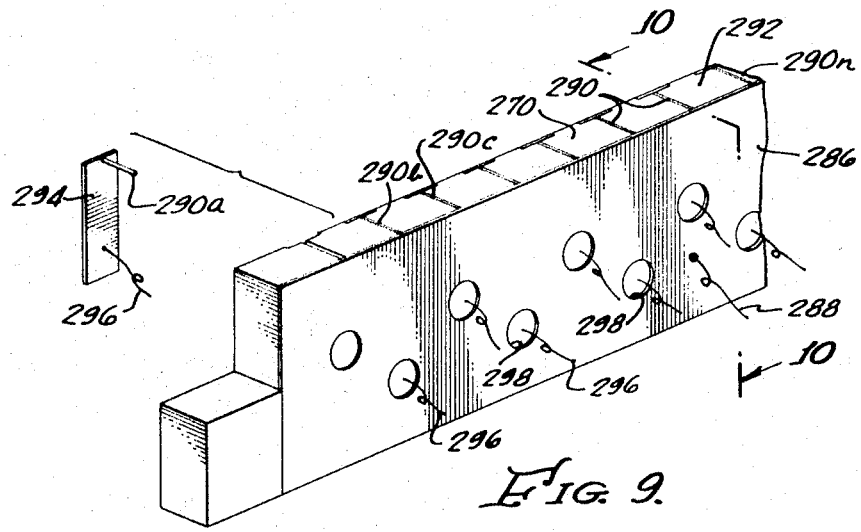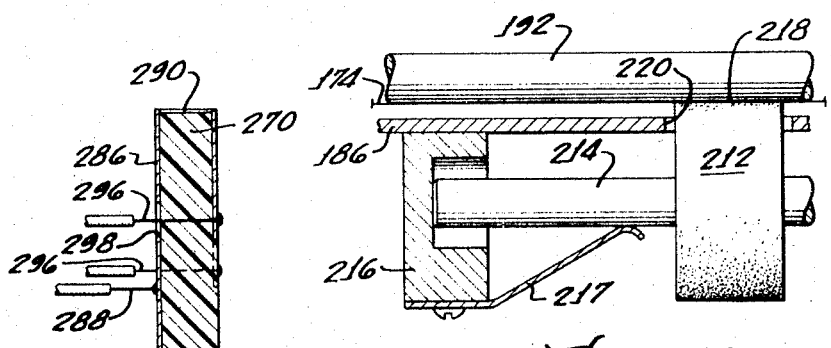

Filed May 17, 1966  12 Sheets-Sheet 7

INVENTOR.
DEAN H. LUXTON
BY FOWLER, KNOBBE
& GAMBRELL
ATTORNEYS.

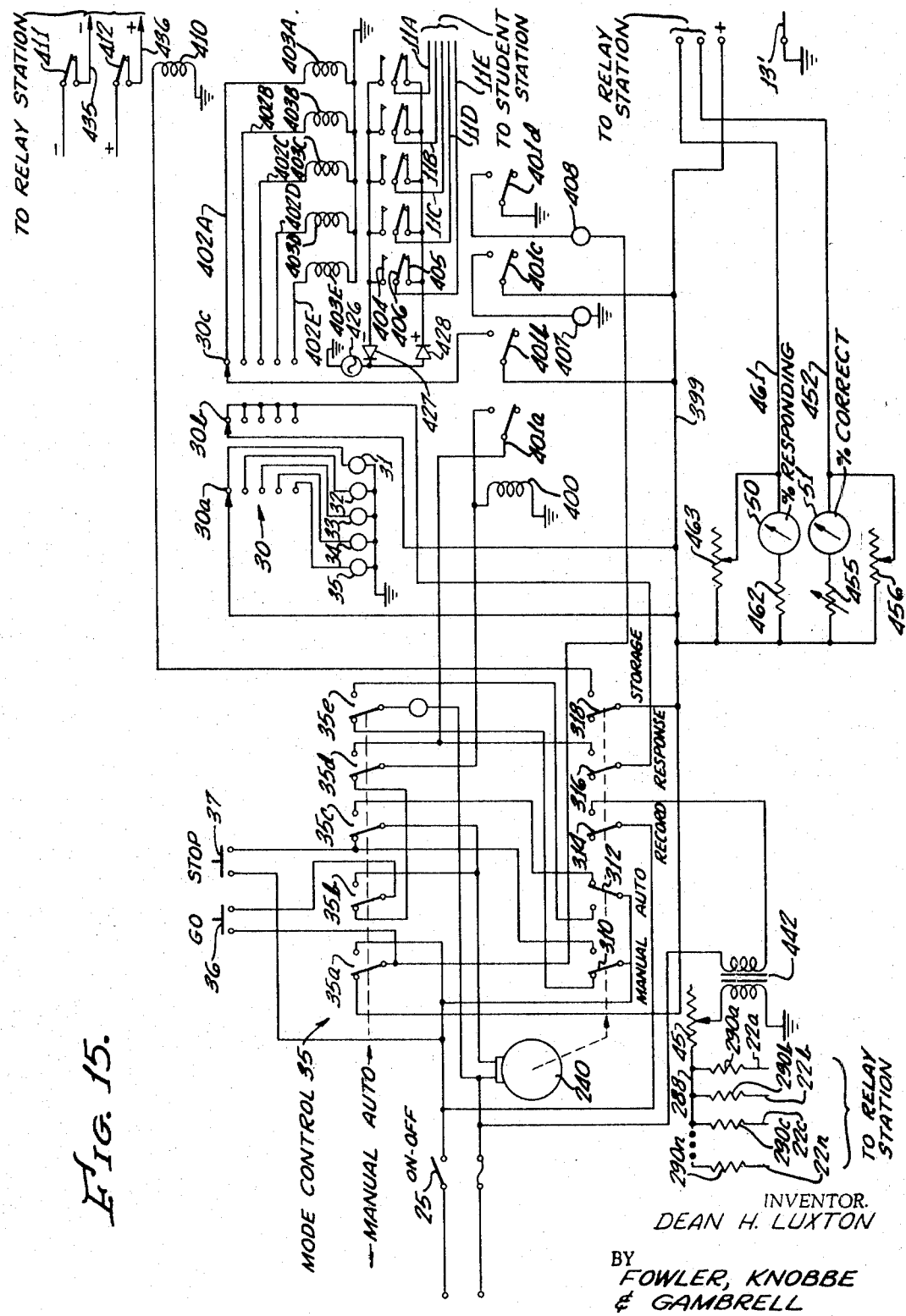

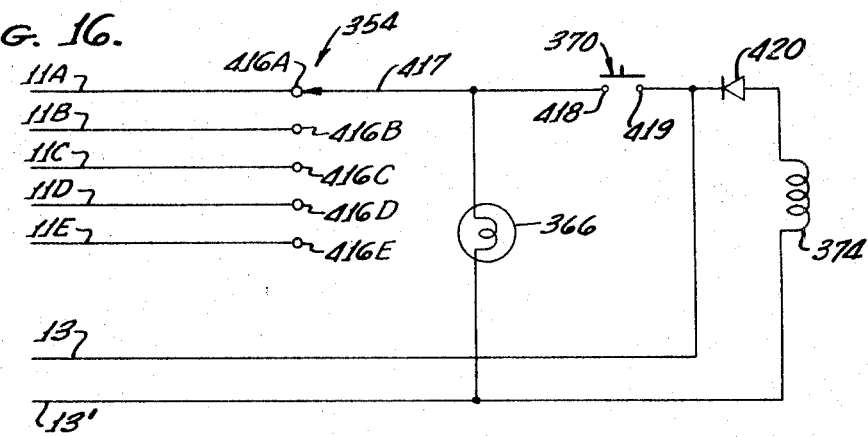
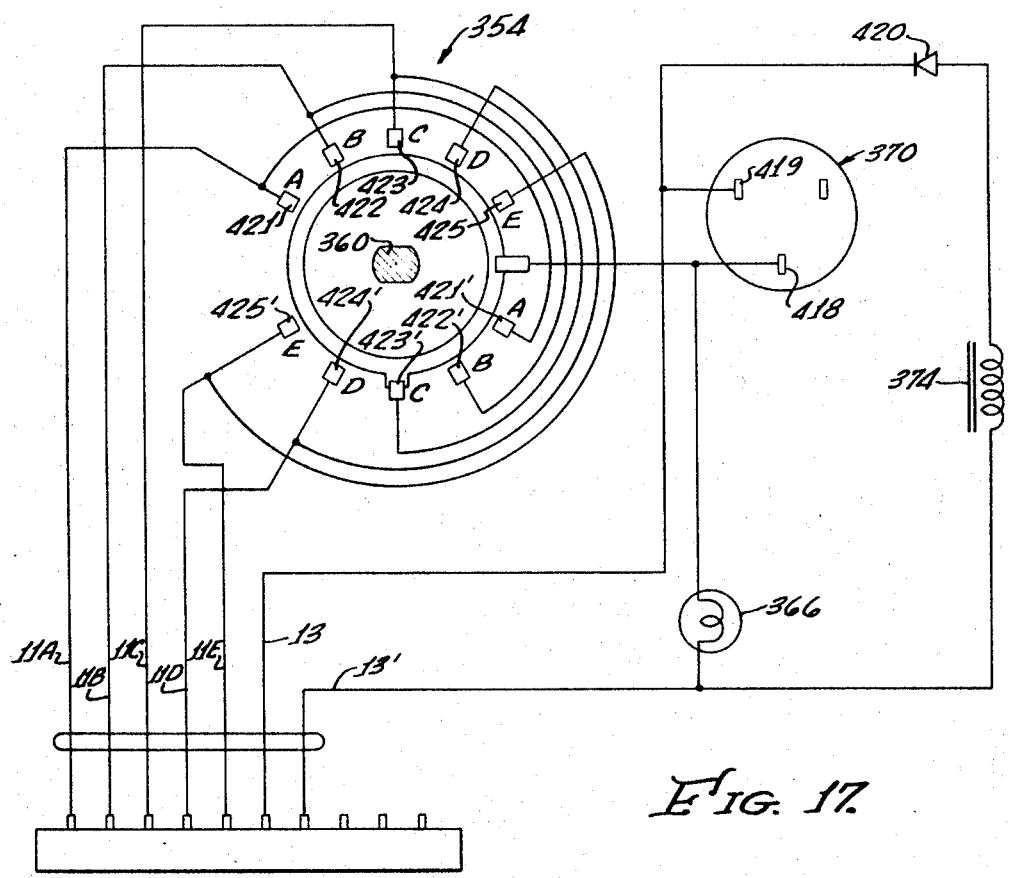

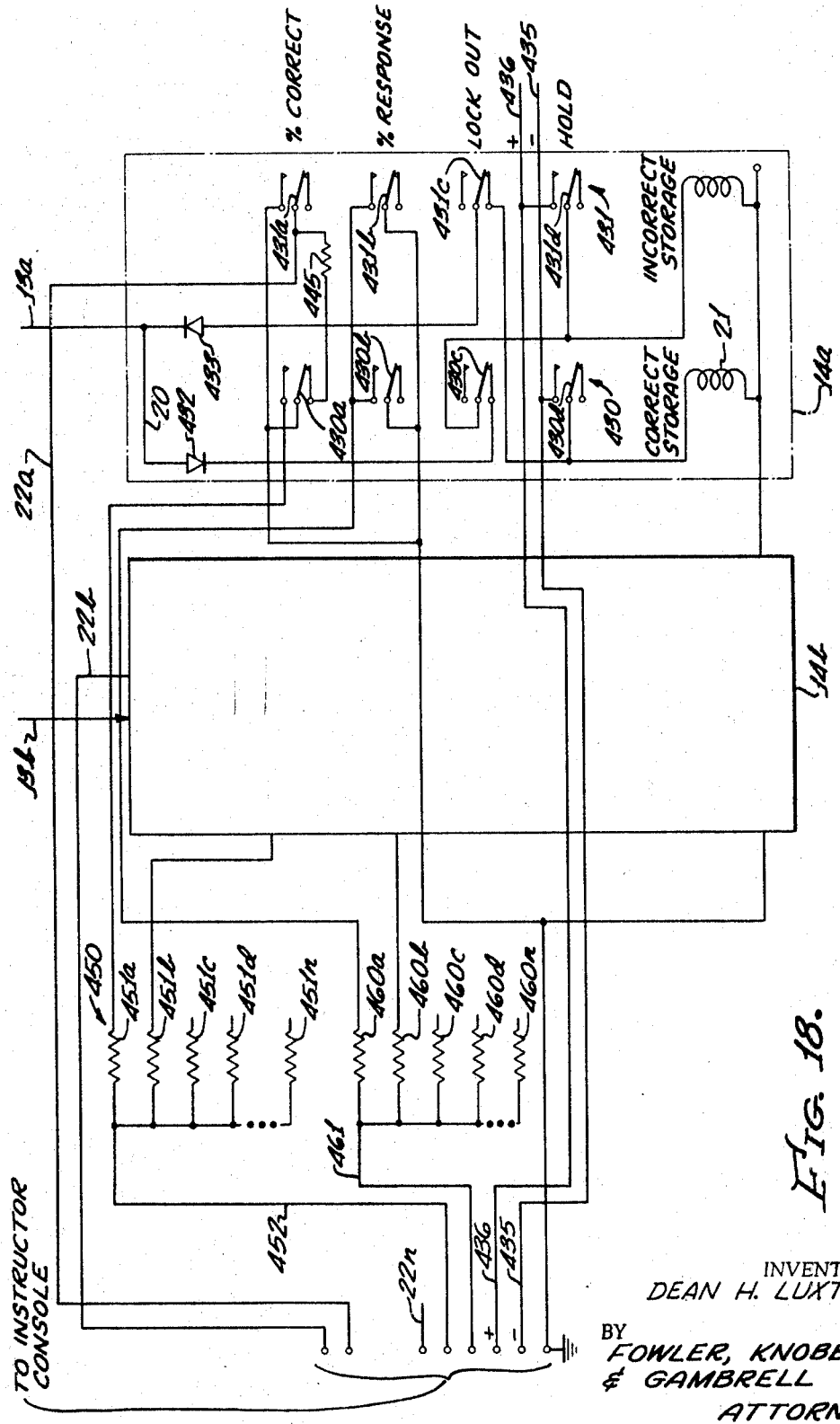

INVENTOR.
DEAN H. LUXTON
BY FOWLER, KNOBBE & GAMBRELL
ATTORNEYS.

United States Patent Office 3,461,571
Patented Aug. 19, 1969

3,461,571
TEACHING SYSTEM
Dean H. Luxton, Newport Beach, Calif., assignor to Robert E. Corrigan
Filed May 17, 1966, Ser. No. 550,851
Int. Cl. G09b 3/00, 7/00
U.S. Cl. 35—9       43 Claims

ABSTRACT OF THE DISCLOSURE

A teaching system for classroom instruction includes an instructor station and a plurality of student stations. The teaching station has switch means operable to select the correct answer response to a question and each student station has switch means for selecting any one of a plurality of possible answer responses. An electrical signal is sent from the instructor means to each student station indicating the correct response, a comparison is made at the student station, and the student receives a confirmatory private tactile stimulus if his answer response was correct. If the student receives no stimulus, he may continue to select additional answer responses until he finds the correct one which will be confirmed by the stimulus. A printer at the instructor station permanently records a diagnostic profile showing whether each individual student responded to each individual question, and whether the student's first answer selection to each question was correct or incorrect. Meters at the instructor station also indicate the percentage of students responding to the most recent question and the percentage of students responding correctly to that question.

---

The present invention relates to an improved teaching system for facilitating both individual learning and instructional control in the teaching of a student group.

This invention provides for a classroom learning situation wherein the course material and questions covering this material are presented by a live instructor or by an automated instructional presentation. Each student is provided with a personal answer station which enables him to communicate answer responses to the instructor on a private and individual basis. In addition, means are provided for communicating the correct answer to each student on a private and individual basis following his initial answer response. In this manner, the student receives knowledge of his results throughout the classroom period and moreover, obtains his knowledge virtually instantaneously, whereby a situation is provided which is highly conducive to learning.

This invention further improves the learning situation by continuously presenting the instructor with a quantitative measure of how well the students are learning the material which is being presented to them. Probably every student has been part of a learning situation wherein the instructor erroneously assumed that certain material was obvious and that it was therefore unnecessary to offer such material or explain it to the student group, whereupon the class or at least a substantial portion of the class was "left in the dark" for the remainder of the lecture. This predicament can be almost entirely obviated by this invention. Thus, the response from each student is automatically accumulated as the initial answer choices are made to provide immediate quantitative information regarding both the percentage of students in the group who answered correctly on their initial response to the question presented and the percentage of students who failed to respond at all to the question. The instructor is therefore provided with meaningful information concerning the interest and motivation of his student group, their understanding of the material which he is presenting, and the effectiveness of his teaching presentation. The instructor may accordingly tailor his presentation to fit the student group before him and progress his instruction at a rate closely matched to the learning rate of his student group.

The instructor is further assisted by this invention in that a permanent recording is made for the response of each student in the group, indicating whether an individual student was correct or incorrect in his initial answer choice or whether he failed to commit a response to the question. In this manner, a diagnostic profile for each student is automatically prepared. Also, this record is temporal in nature, that is, it provides a permanent historical profile of the student's response participation.

In the preferred embodiment of this invention, each student station provides a private sensory stimulus to the student when he makes the correct answer response. This stimulus both confirms his answer choice and supplies a reinforcer or reward to the student for each correct answer choice, thereby encouraging active response participation on the part of the student. Advantageously, this stimulus is totally independent of the student position or the classroom size or environment so that the stimulus is not masked by other classroom conditions such as noise or high or low ambient light. In addition, the stimulus should be completely private and individual to each student while being a pleasing reinforcer. These criteria are all met by this invention wherein the stimulus is perceived tactually rather than through the visual or auditory senses. These latter senses are normally used during a classroom situation whereas the sense of touch is not normally associated with or used during the learning process. Accordingly, this tactile stimulus is received by the student through what may be termed a "clear channel" or signal path wholly independent of ambient sound or light or student position and equally effective in a learning situation involving a few students in a small room or a very large number of students in a large auditorium.

Another feature of this invention is that it is very useful for testing a group of students. Since the answer responses are communicated by each student to the instructor in an individual and private manner and the correctness of the responses automatically determined and a permanent record made, tests may be both administered and graded simultaneously. Moreover, the teaching system herein described encourages the instructor to design tests which not only sample the student's knowledge of the course material but which also involve the student in a learning situation. Thus, tests may be administered with this system wherein each student is given cumulative confirmation of the correct answers during a test and immediate access to the correct answer to any question which he misses, without however disclosing the correct answer to any other student.

This invention further relates to computer integrated teaching systems wherein the computer is programmed to conduct the entire instructional presentation or, used as a tool for assisting the instructor to most effectively present the instructional materials to the student group.

A more thorough understanding of the invention may be obtained by a study of the following detailed description taken in connection with the accompanying drawings, in which:

FIG. 4 is a sectional view through the instructor console taken generally along lines 4—4 of FIG. 2;

FIG. 5 is a horizontal section through the instructor console taken generally along lines 5—5 of FIG. 4;

FIG. 6 is a sectional view taken generally along lines 6—6 of FIG. 5 illustrating the ratchet and pawl sheet advancing mechanism;

FIG. 7 is a sectional view taken generally along lines 7—7 of FIG. 5 illustrating the sheet retaining means;

FIG. 8 is a cross-sectional view through the instructor console taken generally along lines 8—8 of FIG. 5 illustrating the stylus assembly;

FIG. 9 is a partially exploded perspective view of the stylus assembly removed from the cabinet;

FIG. 10 is a cross-sectional view through the stylus assembly taken generally along lines 10—10 of FIG. 9;

FIG. 11 is a sectional view taken generally along lines 11—11 of FIG. 5 illustrating the end support of the sheet advancing axle;

FIG. 15 is a schematic circuit diagram of the instructor console;

FIG. 16 is a schematic circuit diagram of the student response unit;

FIG. 17 is another schematic of the student response including a detailed drawing of the selector switch;

FIG. 18 is a schematic circuit diagram of the relay station;

THE SYSTEM AS A WHOLE

Figure 1:
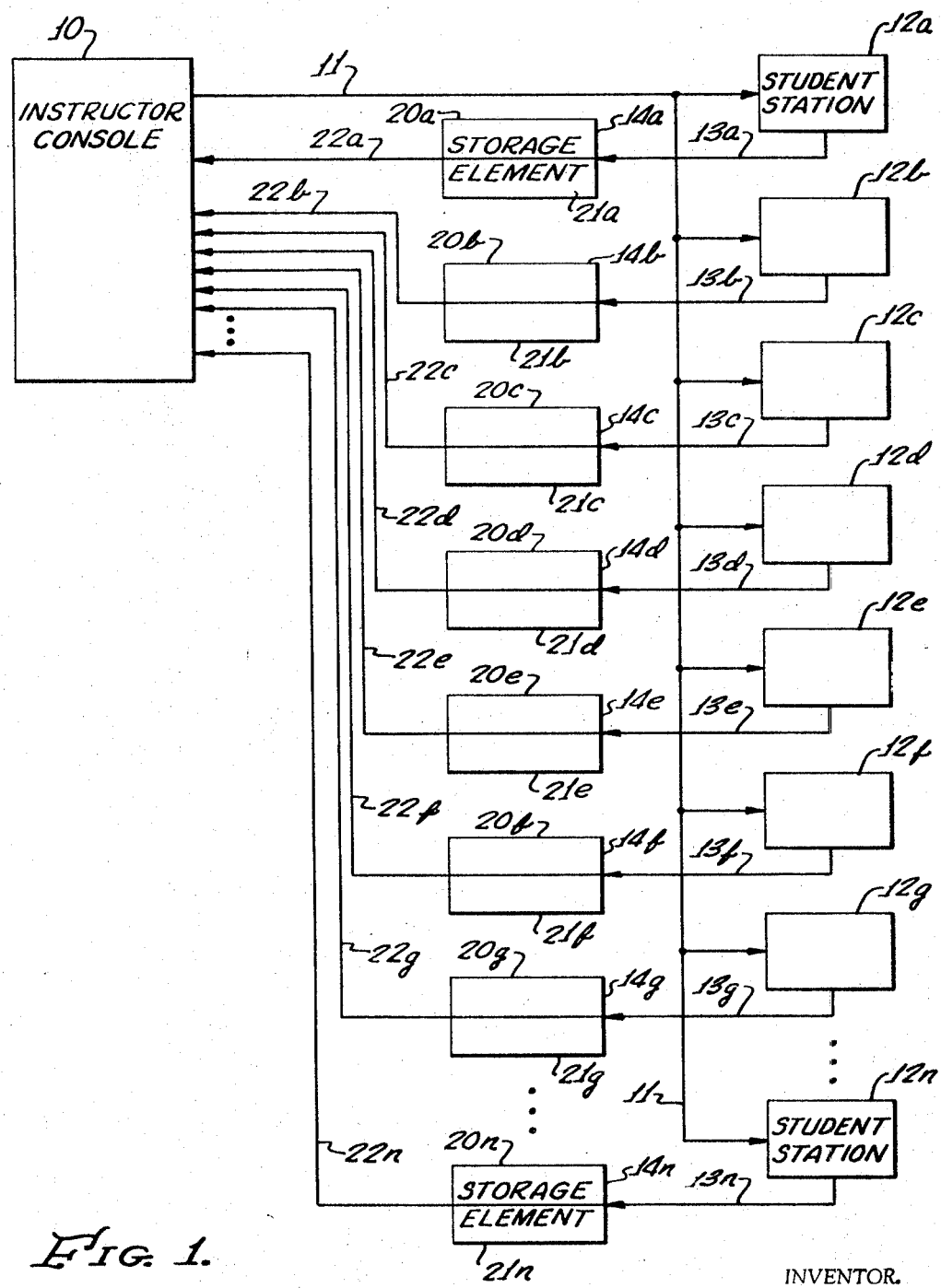
FIG. 1 is a block diagram showing the teaching system as a whole.

Referring to FIG. 1, the teaching system comprises an instructor console 10 for selecting the answer from plural possible answers to a question presented to a group and for measuring student understanding of the material presented. As described in more detail below, the teaching system of this invention is adapted for an instructor console controlled by a live instructor, or for a fully automated instructional presentation using, for example, motion picture films, magnetically taped material, slides, film strips or the like. Whether directed by a live instructor or by an automated program, a specific answer out of several multiple choice answers is selected at the instructor console and a signal corresponding to the selected answer is applied to signal coupling means 11. Means 11 in turn is coupled to the inputs of a plurality of student stations 12a, 12b, 12c, 12d, 12e, 12f, 12g . . . 12n for communicating the correct answer to each.

Each student in a group teaching situation is provided with one of the student stations. Each student station includes means for selecting a desired answer response from multiple answer choices corresponding to the plural possible answers at the instructor console, compares this answer with the answer selected at the instructor console, and communicates whether the selected answer response is correct or incorrect to the instructor console on a private and undivided basis over the output means 13a, 13b . . . 13n which are respectively coupled to the instructor means 10 through associated storage elements 14a, 14b . . . 14n. For example, the output means 13a of student station 12a is coupled to the instructor means 10 via storage element 14a.

Each of the storage elements 14a, 14b . . . 14n are divided into a pair of storage devices 20 and 21. The outputs of each of these storage means are connected by signal carrying means 22a, 22b . . . 22n to respective inputs of the instructor console. The first storage device 20 is responsive to an output of the student station representing the coincidence of the initial answer response by the student and the correct answer selected at the instructor console. The second storage device 21 is responsive to an output of the student station representing the noncoincidence of the student's initial answer response and the correct answer selected at the instructor console. Accordingly, if the initial answer response by the student at station 12a is incorrect, this fact will be temporarily stored in storage device 21a. Likewise, if the initial answer choice by the student at student station 12d is correct, this fact will be temporarily stored in storage device 20d. If a student fails to make any answer response, this fact also is temporarily stored by the associated storage element 14 by sensing that neither of the storage device 20 or 21 have been actuated.

The response period—the period in which the student is given to respond to a given question—is selected at the instructor console. Both manual and automatic modes may be selected. In the former mode the response period is manually controlled by the instructor and in the latter mode, the response period is a preset period of time provided by an automatic time sequencer.

Each student station 12 includes means for providing a private tactile stimulus to the student. When he makes the correct answer response this stimulus provides both a confirmation of the correctness of his answer choice and a reinforcer or reward. This means is operable both during and after the initial answer choice by the student, thereby allowing the student to inform himself of the correct answer as selected by the instructor console. In any case, however, only the initial answer choice of the student is temporarily stored in the associated storage element 14 so that the student's subsequent selection of alternate answer choices does not affect the information communicated to the instructor console via a storage element 14.

The instructor console provides means for interpreting the percentage of students answering correctly on their initial response in terms of the total number of students in the group and means for interpreting the percentage of students responding in terms of the total number of students in the group, thereby measuring the student understanding of the material presented by means of the information communicated from each of the student stations 12 via the storage element 14. Each of the respective storage elements contains the information corresponding to the accuracy of the first answer choice for each question or the absence of any answer choice. This information is accumulated from each student station for indicating the percentage of students who respond correctly to a question on the first answer choice and indicating the percentage of students in the group who failed to make any response to a given question. This information is conveniently conveyed to a live instructor by means of visual displays which provide the instructor with immediate knowledge, as described in more detail below in conjunction with FIGS. 20 and 21, this information may be monitored by a computer so as to select and present the required instruction elements to the student group.

Additionally, the instructor console automatically records the response of each student in the group, i.e. whether an individual student was correct or incorrect on his initial answer response, or whether he failed to commit a response to a question presented by the instructor or automated sequence of instruction. In this manner, the instructor console prepares a dignostic profile for each student position in the classroom by recording for each question the accuracy of the answer choice and the fact that an answer choice was or was not made.

Figure 2:
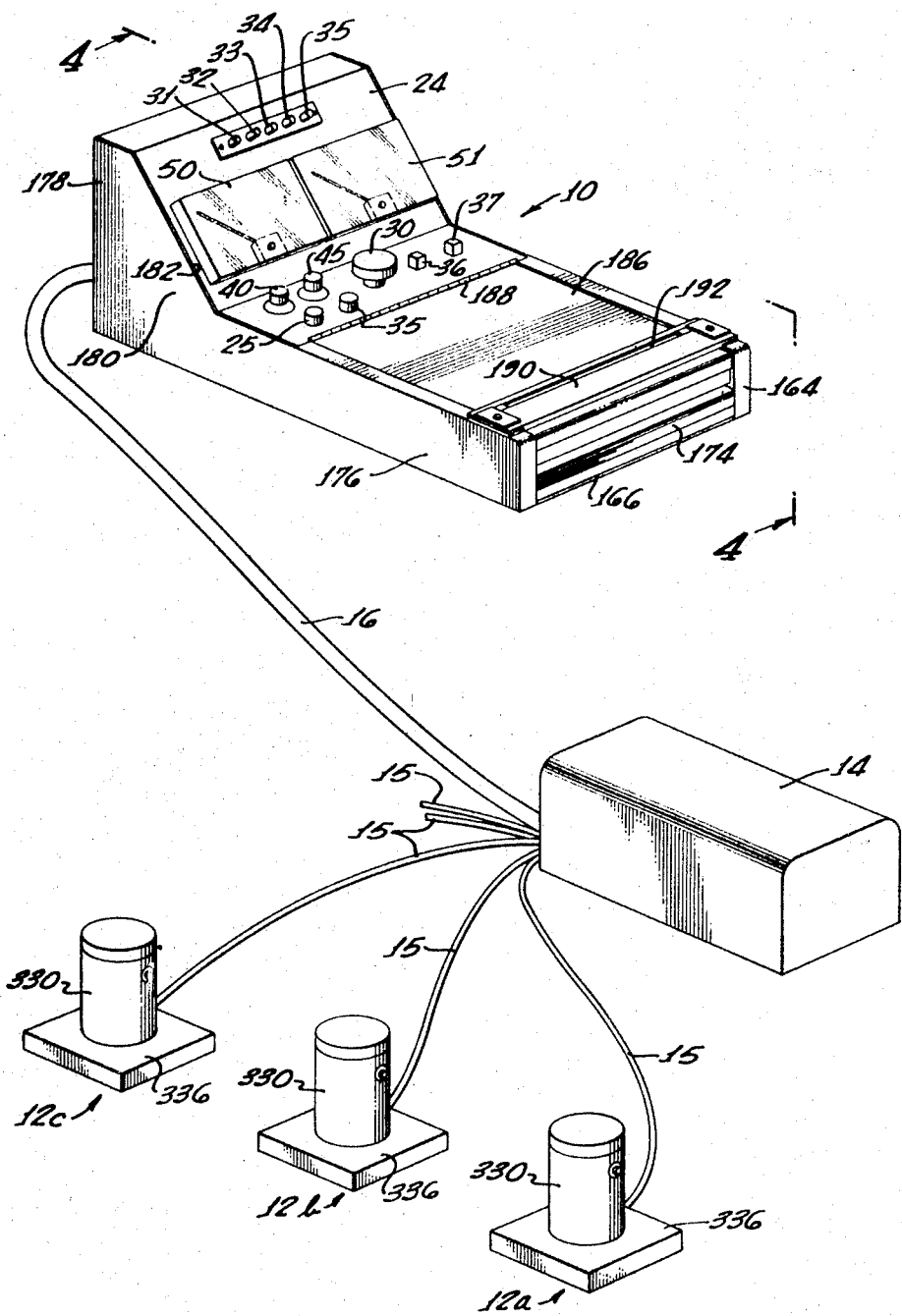
FIG. 2 is a perspective view of the external configurations of the instructor console, several student stations and a relay station.

FIG. 2 illustrates an exemplary embodiment of the system including an instructor console 10, a plurality of student stations 12a, 12b, 12c, and a relay station 14 housing the storage elements 14a . . . 14n. The signal connecting means 11 is included in the electrical cables 15 and 16, while the station output means 13a . . . 13n are included in cable 15 and the signal carrying means 22a . . . 22n are part of cable 16.

THE INSTRUCTOR CONSOLE

The instructor console 10 includes the combination of a control board, a recording medium guide, a recording medium advancer, a printer and a timer all mounted on a cabinet.

*The cabinet.*—As is shown most clearly in FIGS. 2, 4 and 5, the instructor console cabinet or supporting member has parallel side members 164 connected by a bottom plate 166, a back plate 168, and a front plate 170, the lower edge 171 of which is spaced from the bottom plate. A wall 172 extending horizontally rearward from the lower edge of the front plate 170 and then down to the bottom panel 166 defines a storage space for the recording medium which are advantageously sheets of heat sensitive paper 174, the sheets being accessible from the front. Each side member 164 has a relatively low forward portion 176 and a relatively high rear portion 178 joined by a central portion 180 having a sloping upper edge 182.

*The control board.*—As is shown in FIG. 2, the control board 24 extends from the rear of the cabinet a short distance forward of the central portion 180 and is supported on the upper edge of the cabinet sides. The control board is shown in detail in FIG. 3 and includes a control section and a monitoring section.

The control section of the instructor console allows the instructor to encode one of five multiple choice answers in the system. An answer select switch 30 is located on the control board for manual selection of these answers by a live instructor. When the power switch 25 is rotated to the ON position, the desired answer is selected by rotating this control knob until the desired one of the indicator lamps 31, 32, 33, 34 and 35 is illuminated. Thus, if the desired correct answer is in the first or A position, the control knob 30 is rotated so as to illuminate indicator 31.

The instructor console provides for either a manually selected student response period or an automatic time sequence for this period as determined by the position of the mode control switch 35 on the control board. In the manual mode, the response period is initiated by depressing the GO push button 36 and manually terminated by pushing the STOP button 37. The control section also provides, through the use of an internal timer described below, a timed interval response period when the automatic mode is selected by the mode control switch 35. The instructor then initiates a response period by pushing the GO button 36 and the response period is automatically terminated after a preset time period.

The attendance control knob 40 is provided for normalizing the readout meters on the monitor board as described below. The stylus control knob 45 is used to adjust the printing apparatus also described below.

The monitor section comprises a "percent responding" visual readout meter 50 and a "percent correct" visual readout meter 51. During the student response period, as each student responds, the percent responding meter integrates these responses for indicating the percentage of the student group which responded. For example, if there are 20 students in the class and only 10 respond to a given question, the meter will read 50%. Meter 51 displays the percentage of students in the group who answered correctly on their initial response to a given question out of all students in the group. Thus, if out of a class of 20 only 4 of these respond correctly, meter 51 will indicate 20%. The meter readings are held for a predetermined period of time, e.g. 3 seconds, after the end of a response period to read and record final integrated scores.

*The recording medium guide.*—Referring to FIGS. 2 and 4, a support surface 186 rests on the upper edges of the cabinet sides forward of the control panel 24. The control panel is pivotal with respect to the cabinet and support surface about an elongate hinge 188 to provide access to the cabinet interior. An elongate retaining member 190 extends over the forward end of the support surface 186 perpendicular to the cabinet sides. An elongate roller 192 is mounted in the retaining member for rotation about an axis parallel to the length of the retaining member and to the width of the support surface.

As is shown most clearly in FIG. 7, an elongate guide rod 194 affixed to each end of the retaining member by a screw 195 extends down into a bore 196 in the cabinet sides to position the retaining member. The bore 196 has an upper portion 198 of about the same diameter as the guide rod 194 and an enlarged diameter lower portion 200 forming an internal shoulder 202 at the transition of diameters. An enlarged diameter annular piston 204 on the lower end of the guide rod cooperates with the shoulder 202 of the bore wall to limit upward movement of the retaining member away from the support surface 196. Thus, the retaining member is movable between a lower position adjacent the support surface in which it retains and guides a sheet of recording medium against the support surface (shown in full lines in FIG. 7) and an upper position spaced from the support surface in which it releases the sheet (shown in phantom in FIG. 7).

A pair of permanent magnets 206 are recessed in each side of the cabinet beneath the end of the retaining member and on opposite sides of the bore 196. The magnets exert a magnetomotive force which attracts magnetic plates 208 affixed to the lower side of the retaining member near its ends to urge the retaining member to its retaining position. A compression spring 210 within the bore 196 engages the bottom 166 of the cabinet and the enlarged diameter piston 204 to exert an upward force urging the retaining member to the release position. The strength of the magnets 206, relative to the strength of the springs 210, is selected so that the magnetomotive force exceeds the opposing spring force when the retaining member is in the retaining position, and the resilient spring force exceeds the magnetomotive force when the retaining member is in the release position. Thus, the retaining member can be manually moved to either the gripping or release position, and it will remain there.

*The recording medium advancer.*—Referring particularly to FIGS. 4–6 and 11, a pair of sheet advancing wheels 212 are mounted on an axle 214 which extends substantially parallel to the length of the retaining member. The ends of the axle are rotatably received in journals 216 fastened to the underside of the sheet support member 186. Plate springs 217 support the ends of the axle and urge the upper part of each wheel periphery 218 through a slot 220 in the sheet support member 186 to a position slightly above the support surface. When the retaining member is in the lower position, the elongate roller 192 engages the upper point on the periphery of the advancing wheels 212 to grip a sheet of heat sensitive material 174.

A ratchet and pawl assembly, illustrated most clearly in FIGS. 4–6, rotates the advancing wheels 212. A ratchet wheel 222 affixed to the axle 214 by a set screw 224 has teeth 226 which are engaged by one leg 228 of an L-shaped actuating pawl 230. The actuating pawl is a spring plate which advances the ratchet wheel 222 through a preselected arc, for example thirty degrees, each time the pawl moves in the forward direction and flexes to engage the next clockwise tooth 226 as the advancing pawl 230 moves rearwardly. During the rearward stroke of the advancing pawl 230, the ratchet wheel is held against rearward movement by a retaining pawl 232 which engages the teeth and is pivotally affixed to the underside of the sheet support member 186. The other leg 234 of the advancing pawl is screwed to a rocking cradle 236, the legs 238 of which are pivotally mounted on the axle 214.

To actuate the pawl, the cradle 236 is rocked by a timing motor 240 suitably mounted interior of the cabinet on an upstanding bracket 242 near the back panel. The rotary shaft 244 of the motor extends through the motor bracket 242 and a similar shaft bracket 246 which is substantially aligned with the ratchet 222 and pawl 230. A cam disc 248 on the distal end of the rotary shaft 244 cooperates with a cam follower 250 intermediate the ends of an actuating lever 252. The lower end of the lever is pivotally supported on the shaft bracket at 254 and its upper end is connected to the cradle 236 by an elongate rod 256. The lever is urged rearwardly by a tension spring 258 bolted to the upper end of the arm at 260 and fastened to a stud 262 on the bracket 246. The bolt 260 also connects the rod 256 to the lever 252.

The cam disc 248 has a constant radius portion 264 extending approximately 315 degrees around its periphery, and the remaining cam surface 266 has a relatively sharp decrease in radius over about 5 degrees of arc and a gradually increasing radius over about 40 degrees. As the disc 248 rotates clockwise, e.g. beginning at point 263, the lever 252 remains in the forward position and the advancing wheels 212 remain stationary until point 265 on the cam surface reaches the follower 250. Then, as the follower rides down the sharply decreasing radius portion point 267, the actuating lever 252 is rapidly pulled rearwardly causing the advancing pawl 230 to move rearwardly and engage the next clockwise tooth on the ratchet wheel 222. As the disc continues to rotate, the follower rides past the low point 267 up the increasing radius portion of the cam surface to urge the actuating lever forward causing the advancing pawl to rotate the sheet advancing wheels 212. The advancing wheels and the elongate roller 192 have relatively high friction surfaces so that a sheet gripped between them is advanced rearwardly a short distance over the support surface 186 each time the ratchet is actuated.

*The printer.*—Referring now to FIGS. 4, 5 and 8–10, a stylus assembly 268 disposed beneath the retaining member 190 marks the heat sensitive medium. The stylus assembly 268 includes an elongate generally rectangular block 270 of thermally and electrically insulative material which extends upward through an elongate slot 272 across the support surface. The block 270 is supported from the cabinet sides by a bracket 274 at each end. Each of the brackets includes a channel member 278 screwed to the underside of the sheet support surface 186. Each channel extends downward from the support surface and opens toward the adjacent side 164 of the cabinet. A plate spring 280 screwed to the lower leg of each channel 278 is suitably bent to resiliently support the insulation block 270 and urge it upward into an elongate slot in the underside of the retaining member 190. A tongue 282 on each end of the block extends loosely through a slot 284 in one of the channels to limit upward movement of the stylus when the retaining member is moved to the release position. Preferably the stylus does not press the sheet into contact with the retaining member so that the chemical coating on the sheet does not accumulate on the retaining member. For this same reason, the lower edges 283 of the slot are rounded.

The back surface of the insulation block is covered by an electrically conductive plate 286 connected to a common bus 28. A plurality of thin high resistance heating filaments 290 of suitable material, e.g. tungsten, extend across the upper longitudinal edge 292 of the insulation block at uniformly spaced points along its length. One end of each of these wires is in electrical contact with the grounded plate 286 and the other end is in electrical contact with one of a plurality of flat terminal plates 294 inset in the front side of the block. An electrical conductor 296 extends from each terminal 294 through the insulation block and through one of a plurality of apertures 298 spaced along the plate 286. Alternate ones of the terminal plates 294 are short and long to increase the spacing between the apertures and the electrical conductors. The rearward end of each wire 296 is connected to appropriate control mechanism as will be described hereinafter, so that when current is passed through any of the wires 296, a filament 290 is heated to mark the heat sensitive paper 174 at the point which that filament contacts, thereby recording each student's response individually and making a diagnostic profile for each student.

Other printing devices may be employed for recording the responses of the student. By way of specific example, a voltage sensitive medium such as a paper sheet having successive layers of graphite and wax may be used as the recording medium. A permanent record is made on such a sheet when a potential of suitable magnitude is applied between the outer surface of the wax and graphite layer so as to melt the wax and expose the under layer of graphite. In a recorder for the teaching system, a plurality of electrodes positioned above the wax layer would be energized corresponding to the correctness of the student responses to thus prepare a permanent diagnostic profile.

*The timer.*—The timing motor 240, and the paper advance cam disc 248 which is fixed on one end of the rotary shaft 244 are part of the timer. Further, as is most clearly illustrated in FIG. 5, the timer includes a manual operation cam disc 300, an automatic operation cam disc 302, a record cam disc 304, a response cam disc 306, and a storage hold cam disc 308 which are fixed to the shaft 244 in spaced relationship between the brackets 242 and 246. Each of the cam discs 300, 302, 304, 306, 308 has a relatively large radius portion and a relatively small radius portion to activate an associated switch 310, 312, 314, 316 and 318 respectively for controlling the operating cycle of the system as will be described below.

Figure 12:
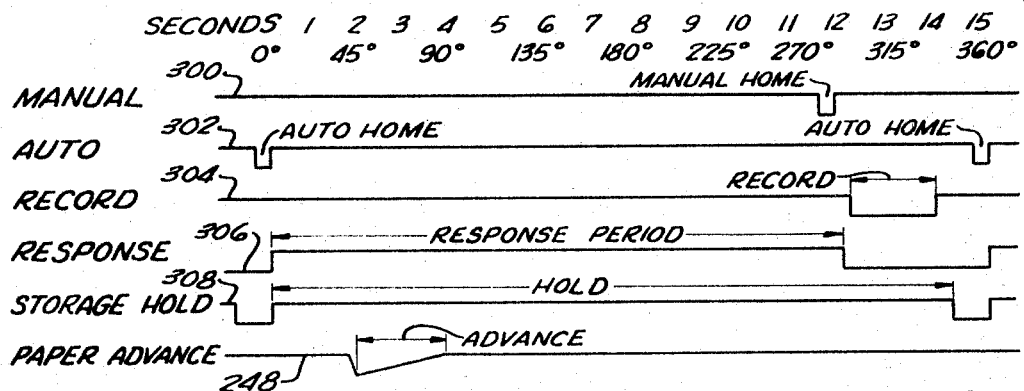
FIG. 12 is a schematic diagram of the cam surfaces of the timing cams.

The relative arcuate lengths and positions of the cams on the switch operating cam discs 300, 302, 304, 306 and 308 and the paper advance cam disc 248 are illustrated schematically in FIG. 12. The manual disc 300 and the automatic disc 302 each has a reduced radius "home" position, the manual home position trailing the automatic home by about 270 degrees. The record disc has a reduced radius "record" sector which begins after the manual home position and terminates before the automatic home position returns. The response disc has an enlarged radius "response period" sector which begins immediately after the automatic home position. The response sector terminates after the manual home position and before the record sector begins. The storage hold disc has an enlarged radius "hold" sector which begins with the response sector and terminates after the record period and before automatic home position returns. The "advance" sector of the paper advance disc is disposed in the early portion of the response period. In the exemplary embodiment, the timing motor is designed to make one revolution in fifteen seconds. The arcuate extent of the response sector is, for example, about 288 degrees so that the timing motor requires about 12 seconds to traverse the response period leaving about three seconds for recording and resetting the storage relays. This 3 seconds also allows the instructor to read the score on the meters 50 and 51 after all responses are in.

THE STUDENT STATIONS

Figure 13:
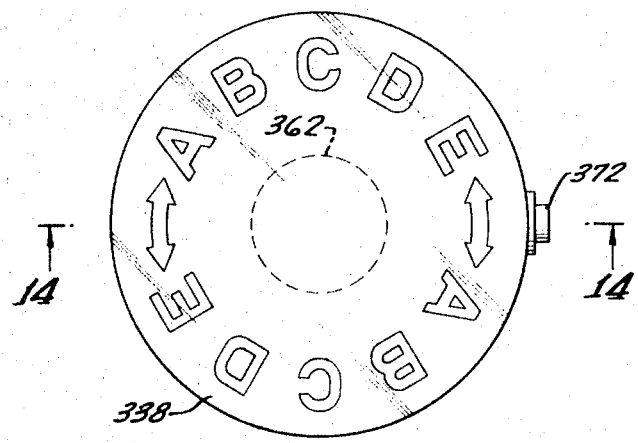
FIG. 13 is a plan view of a student response unit.
Figure 14:
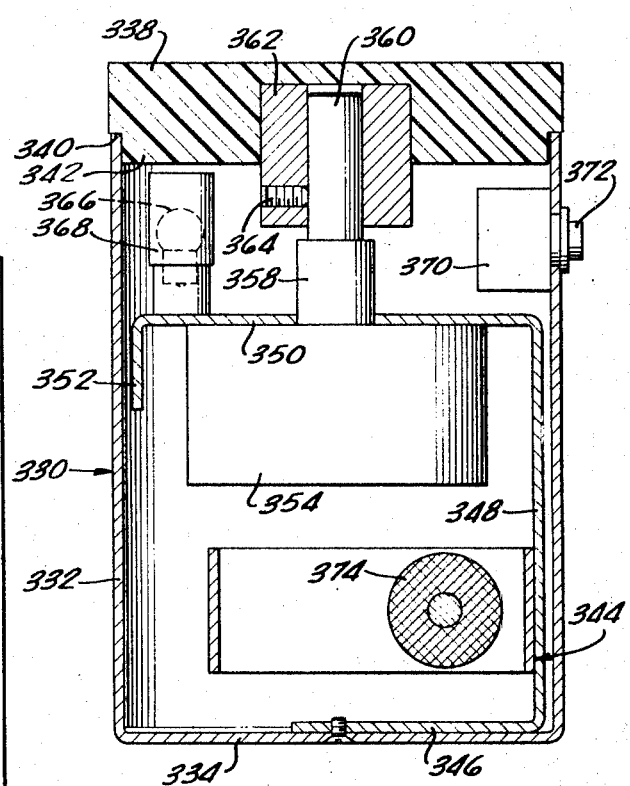
FIG. 14 is a vertical section through the student response unit taken generally along lines 14—14 of FIG. 13.

Referring particularly to FIGS. 2, 13 and 14, each student station 12 or student response unit includes a housing 330 having a cylindrical side wall 332 and a bottom wall 334. The housing rests on a small stand 336. The top of the housing is covered by a rotatable selector disc 338 having an annular shoulder 340 which rests on the upper edge of the housing, and a reduced diameter portion 342 which extends downward into the housing. The selector disc includes a plurality of translucent indicia A, B, C, D and E, representing the various possible answers to each question.

A mounting bracket 344 interior of the housing has a lower leg 346 which is fixed to the bottom wall of the housing, an upstanding leg 348 which extends vertically along the side wall of the housing, an upper leg 350 which extends diametrically across the housing, and a downwardly extending flange 352 at the free end of the upper leg. A multi-contact rotary selector switch 354 is affixed to the underside of the top leg and has a reduced diameter portion 358 which extends through the upper leg. The operating shaft 360 of the selector switch 354 extends out of the upper end of the reduced diameter portion 358 and is fixed to the selector disc 338 by a sleeve 362 and set screw 364.

A small lightbulb 366 mounted at the free end of the upper leg is visible through the translucent indicia in the selector disc 338 immediately above it. An elongate cylindrical shade 368 around the lightbulb extends to a point immediately below the selector disc to narrow the visual path of the light so that only the one indicia directly above the bulb appears to be directly illuminated. Advantageously, the letters on each side of the selected letter are slightly illuminated to provide a reference for the student in a darkened room. Further, the indication to the operating student is private as the shade shields the perception angle from all the other students in the group.

A switch 370 actuated by a push button 372 mounted in the side wall of the cylindrical housing is adapted to be pressed by the student to complete an appropriate circuit to the relay station 14 after the student has rotated the selector disc 338 to the position indicative of the answer A, B, C, D or E which he has selected.

An electromagnetic vibrating coil 374 is mounted on a U-shaped bracket 376 extending inwardly from the vertical leg 348 of the mounting bracket. The coil 374 causes the housing to vibrate when the coil is energized. As will be described in more detail below, the coil is energized upon pushing the switch button 372 only if the student has selected the correct answer to the multiple choice question. Thus, the vibration of the housing indicates tactually to the student that he has selected the correct answer. This vibration is a pleasing sensation to the student's sense of touch and cannot be seen or heard by the other students. Accordingly, this tactile stimulus is a wholly private one and not available to cue other students on the correct answer selection even in the event that a neighbor may perceive the answer choice selected by a fellow student.

DETAILED OPERATIONAL DESCRIPTION OF THE TEACHING SYSTEM

Automatic mode

The automatic mode is selected by actuating mode control switch 35 on the instructor console 10 to the automatic select position. Referring to FIG. 15, the switch 35 includes a series of single pole-double throw stages 35a, 35b, 35c, 35d and 35e. In the figure, each of these stages is shown in the manual select position.

The operation of the instructor console is initiated from either a manual home or automatic home position of timing motor shaft 244 (FIG. 5) depending upon the position of the mode selector switch 35. In the automatic mode, the shaft is initially at the auto home position (FIG. 12), wherein switch 312 is disengaged by cam 302 placing its movable contact in the position opposite that shown in FIG. 15. If the shaft is not immediately so positioned when switch 25 is thrown to the ON position, power is applied to the timing motor 240 via the ON-OFF switch 25, the auto home switch 132, and stage 35c of the mode selector switch, until the auto home switch is disengaged by cam 302 to set the movable switch contact to the position which is opposite that shown in the figure. The instructor console is then ready for the correct answer to be inserted by the instructor.

*Answer selector means.*—The instructor inserts the correct answer into the system at his console by rotating answer select switch 30 to one of five positions—A, B, C, D and E. Answer selector switch 30 comprises three multi-selector switch levels 30a, 30b and 30c. Level 30a selectively connects power from the D.C. power bus 399 to one of the five indicator lamps 31, 32, 33, 34 and 35 located at the instructor console. Switch level 30b functions to automatically terminate the response period if the answer selector switch is moved during the student response period. The use of this circuitry will be explained in more detail below. Switch level 30c comprises a movable contact arm connected to fixed contact 401b of relay 400. This arm is switched to one of five control lines—402A, 402B, 402C, 402D or 402E—to cause appropriate signals to be supplied to the student select switch during the response period, as described hereinafter. After the answer selector switch has been actuated to select the answer from the five possible positions, the system is ready for initiating a response and record cycle.

*Response period during automatic operating mode.*—The response period is initiated when the instructor depresses the GO button 36 at the instructor console. When this switch closes, power is supplied to the timing motor 240 via the ON-OFF selector switch 25, level 35a of the mode selector switch, and level 35b of the mode selector switch. When shaft 244 has rotated through only a few degrees of rotation, the auto home switch 312 is actuated by cam 302 and electrical power continues to be applied to the timing motor via switch 312 for a complete timing period.

As shown in FIG. 15, the response period is initiated immediately following the auto home period (see also FIGURE 12). During the response period, the relay 400 is energized from the D.C. power bus 399 through level 35d of the mode selector switch, the response period switch 316 and the second level 30b of the answer selector switch. Relay 400 includes locking contact set 401a in parallel with level 35d of the mode selector switch. Relay 400 further includes contact set 401c for energizing the response lamp 407 located behind the GO push button when the relay armature is actuated. The acuation of relay 400 applied positive D.C. potential to the movable selector arm at level 30c of the answer selector switch. Accordingly, one of the five lines 402A, 402B . . . 402E is energized resulting in actuation of a corresponding one of the five relays 403A, 403B, 403C, 403D and 403E. Each of these relays includes a respective first fixed contact 404 connected to negative D.C. power, a second fixed contact 405 connected to positive D.C. power and a movable contact 406 controlled by the relay armature. Each of the movable contacts 406 is respectively connected to instructor console output leads 11A, 11B, 11C, 11D and 11E. Since one and only one of the relays 403 can be actuated at any one time, according to the position of the answer selector switch 30, all of the output leads 11 are connected to a source of positive potential with the exception of the output line connected to that one of the relays 403 which is actuated during the response period in accordance with the position of the answer selector switch. By way of specific example, if the answer selector switch has been rotated to the A position as shown in the figures, relay 403A is actuated resulting in movement of movable contact 406 into engagement with contact 404 and the application of negative potential to the output lead 11A, whereas the remainder of the relays 403B, 403C, 403D and 403E are unenergized and supply a positive potential to leads 11B, 11C, 11D and 11E. Each of the output leads 11A, 11B . . . 11E are connected to every student station as is also a ground or common lead 13'. Accordingly, the instructor console provides mutually exclusive positive and negative output signals, the negative signal representing the correct answer and the positive signal representing the incorrect answers.

A particular advantage of the circuitry shown is that only N+1 leads are required between the instructor console and the student station to communicate N different correct answers. Thus, in the exemplary embodiment shown, the six leads 11A, 11B, 11C, 11D, 11E and 13' suffice for communicating five different correct answers.

The storage hold switch 318 is continuously actuated by its associated cam 308 during both the response and record periods (FIG. 12) thereby actuating relay 410 by connecting its coil to the D.C. bus 399. Relay 410 in turn includes a pair of relay contacts 411, 412 which respectively connect a bus 435 to a source of negative D.C. and bus 436 to a source of positive D.C.

*Recording medium advance.*—As is evident from the timing chart of FIG. 12 and from FIG. 4, the cam portion 266 of the advance cam disc 248 actuates the lever 252 to advance the heat sensitive medium in the manner described above shortly after the GO switch 36 is actuated.

*Student station.*—Referring to FIGS. 13, 14, 16 and 17, each student station includes the signal input leads 11A, 11B . . . 11E, an output response lead 13 and a common or ground lead 13'. The manually rotatable indicator knob 338 is coupled to movable contact 417 of the selector switch 354 for selectively engaging fixed contacts 416A, 416B . . . 416E respectively connected to the signal input leads. Lamp 366 within the student selector station is connected between the movable contact 417 and ground and is accordingly energized for all positions of the selector switch.

The five parallel input leads 11A, 11B . . . 11E and the multiple selector switch 354 provide a means responsive to both the coincidence and non-coincidence of the answer choice as communicated from the instructur console. Thus, mutually exclusive signals are provided on the movable contact arm 417 according to a coincident or non-coincident condition, a negative polarity signal indicating a coincident condition and a positive polarity signal indicating a non-coincident condition.

The student response button 370 serves to bridge a pair of contacts 418, 419 and apply the potential on lead 417 to the output response lead 13. Diode 420 is also responsive to the closing of the initiate button, this diode providing a means for comparing the student's answer choice and the answer selected at the instruction means and supplying a signal to the vibrator coil 374 indicative of the correctness of the answer choice. Thus, when switch 370 is closed, the cathode of diode 420 is connected to the potential on movable contact 417 and its anode 420 is connected in series with a vibrator coil 374 having its other terminal connected to the common lead 13'. Diode 420 is therefore poled so as to present a high impedance to the positive potentials (representing incorrect answers) applied to contact 419 but a low impedance to a negative potential (representing the correct answer) applied thereto. Hence, no vibratory tactile stimulus is provided the student when he pushes his response button 370 if he has failed to make the proper answer choice. However, if the student has selected the correct answer, the negative potential applied to selector arm 417 is connected through contacts 418, 419 of switch 370 and diode 420 to energize the vibrator coil 374 and stimulate the student's sense of touch.

In the system of FIGS. 15 and 16, the direct current supplied leads 11A, 11B . . . 11E is a periodically varying current obtained from an A.C. source 426 and respective oppositely poled diodes 427, 428. This half wave direct current, when applied to the vibrator coil 374, provides the pulsating current for causing the desired vibration. Advantageously, the frame of the vibrator is tuned mechanically to the pulsating current, thus minimizing the current required to produce an adequate vibration.

Only the initial answer choice on lead 13 is communicated to the instructor console. However, after making his initial selection, the student is free to rotate the answer selector to any of the five positions so as to locate that position resulting in actuation of his vibrator upon depressing the initiate button. The student is thus able to privately obtain during the response period confirmation of the correct answer following his initial erroneous answer commitment and thereby facilitate his learning process without influencing the decisions of others.

As described above, the student station is designed to maintain the privacy of an answer response by shielding the perception angle of the selector disc 338. The privacy is further maintained by incorporating a continuously rotatable selector switch 354 as shown in FIG. 17, having a pair of spaced stationary contacts 421–421', 422–422', 423–423', 424–424' and 425–425' respectively connected to the input leads 11A, 11B, 11C, 11D and 11E. As a result, the movable contact 417 engages each of these output leads twice during each complete revolution of the rotatable selector disc 338 (FIGS. 13 and 14). As such, the disc 338 does not assume an arbitrary position for each of the answer responses so that student makes his answer choice without cuing a fellow student concerning the choice which he finally selects.

*Storage elements.*—Each of the relay stations 14 (FIG. 2) includes a plurality of storage elements 14 corresponding in number to the student stations coupled thereto. An exemplary embodiment of the storage element 14a is shown in FIG. 18 comprising a pair of relays 430 and 431. As shown, each of these relays comprises a plurality of single pole-double throw relay contacts. Relay 430 is used to store a correct answer from its associated student station 13a and relay 431 is used to store an incorrect answer from this same student station. Accordingly, these relays are respectively energized in accordance with the correctness of the initial answer choice and thereby function as the storage devices 20 and 21 described above and shown in FIG. 1.

The incoming signal to the storage element 14a from its associated student station 12a is applied on response lead 13a to a pair of signal directing diodes 432 and 433. As described above, if the student has selected the correct answer, a negative potential is applied to lead 13a; contrariwise, if a student has selected the incorrect answer a positive potential is applied to lead 13a. The negative signal or correct response is directed via diode 433 and lockout contacts 431c of relay 431 to the coil of storage relay 430. Actuation of relay 430 locks this relay on via hold contacts 430d which connect the relay coil to negative power bus 435. Also, actuation of relay 430 locks out relay 431 by opening the lockout contacts 430c. Accordingly, after an initial correct selection by the student and application of a negative signal on responce lead 13a, subsequent rotation of the student selector switch to another position and application of a positive potential to lead 13a cannot influence the answer already stored since any positive signals supplied to diode 432 are blocked by the then open lockout contacts 430c.

In a similar manner, an initial incorrect answer selection by the student results in actuating relay 431 and locking out relay 430. Thus, a positive potential is applied through diode 432 and contacts lockout 430c of relay 430 to energize relay 431 which is then held on by its associated hold contacts 431d which connect positive power bus 436 to the relay coil. Energization of relay 431 locks out relay 430 by opening the lockout contacts 431c. Hence, subsequent manipulation of the answer selector switch by the student will be ineffectual in disturbing the answer already stored since any negative signal applied to line 415 will terminate at line 433 because of the open lockout contacts 431c.

The remaining relay contacts 430a, 430b and 431a, 431b are used for recording the student answer at the instructor console in the manner described below. The energized storage relays within the block stations remain energized until termination of the memory hold period after the record period when relay 410 (FIG. 15) is de-energized thereby removing the D.C. potentials from buses 435 and 436.

*Visual readout means.*—The visual readout meters 50 and 51 are active during both the response and record periods so that the instructor console receives an immediate indication of the response of the student group. These meters are energized from a pair of summing networks associated with each pair of storage relays. Thus, as shown in FIG. 18, a first summing network 450 comprises respective resistors 451a, 451b, 451c, 451d, etc., the total number of summing resistors 451 corresponding to the total number of the storage elements 14. Each of these resistors is connected to a common bus 452 and have their other terminals respectively connected to the "percent correct" relay contacts of the "correct" relay 430. Thus, as shown, one terminal of resistor 451a is connected to the normally open fixed relay contact of set 430a. Accordingly, this terminal of resistor 451a is grounded when the correct answer is selected by the student at student station 12a so as to energize the correct relay 430.

Figure 3:
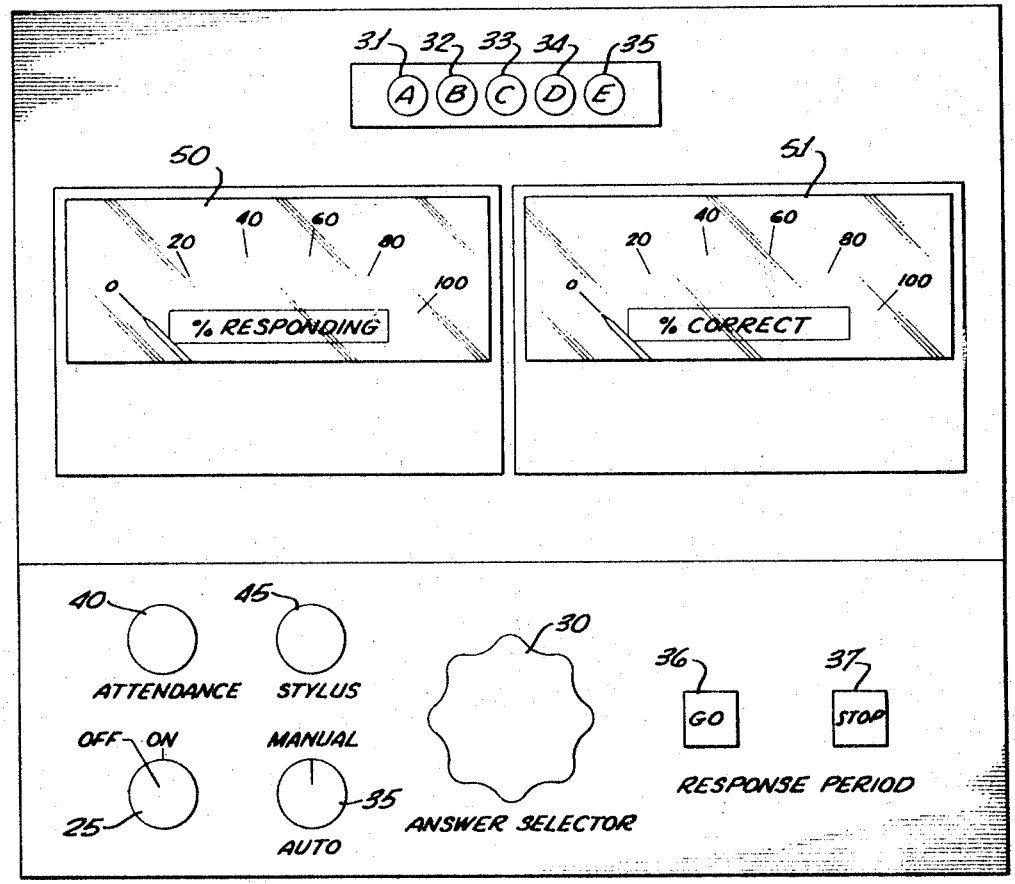
FIG. 3 is an enlarged view of the control board of the instructor console.

Lead 452 is common with all summing resistors 451 and is connected to one terminal of the percent correct visual readout meter 51 (FIGS. 3 and 15). The other terminal of this meter is connected through a variable resistance 455 to the positive potential bus 399. An additional variable resistance 456 is connected in parallel with the series circuit comprising the meter 51 and variable resistance 455. It will be seen that the signal applied to response meter 51 is proportional to the sum of those resistors 451a, 451b . . . 451n which are grounded. Adjustment resistors 455 and 456 are provided to register the meter full scale when all of the student answer selectors indicate a correct response. A direct correlation is then provided between the meter reading and percentage of students in the class who correctly respond to a given question.

Another set of summing resistors 460a, 460b, 460c . . . 460n control the percent responding meter 50. Each of these resistors has one terminal connected to a common lead 461 and their other terminals respectively connected to "percent response" relay 430 and 431. In this manner, each of the summing resistors 460a, 460b, 460c . . . 460n are grounded if either of their associated storage relays are energized. The percent response meter 50 has one terminal connected to the lead 461 and its other terminal connected through a resistance 462 to positive bus 399. An adjustment resistance 463 is connected in series with the meter 462. The meter may then be preset to indicate a full scale reading when all of the student stations have been actuated. Any number less than this provide a proportionately smaller reading on the meter since a proportionate number of summing resistors 460 are open circuit if the student has failed to select an answer.

A particular feature of this visual readout means is that the student responses are displayed cumulatively for the instructor so that he may interpret the rate and percentage of correct response by his students from the start of the response period to the termination of the response period. Following the response period, these meter readings are held for a predetermined period of time, e.g. 3 seconds, so that the meter positions remain fixed for a sufficient time to read and record the final integrated values.

*Termination of response period.*—The student response period terminates when the timing motor rotates cam 306 so as to open response period switch 316. Relay 400 is then released. Source 426 which supplies power to buses 11A–11E is controlled by relay 400 by a pair of relay contacts (not shown). When relay 400 de-energizes, the source 426 is deenergized. All power in each student station is then lost and the station goes dead. The storage relays, however, remain locked in the mode of the initial selection by the student. As described above, these relays memorize the correctness or lack of response from each student station and remain held in position by cam 308 and hold switch 318 after the response period has terminated.

The response period is also automatically terminated if the answer selector switch 30 is moved during this period. Thus, rotation of this switch lifts the movable contact of switch level 30b from the stationary contact set, resulting in opening the circuit leading from power bus 399 to the coil of relay 400 and releasing of this relay.

*Record period during automatic operating mode.*—The record period is initiated following the response period by cam 304 and switch 314 (see FIG. 12). Closing switch 314 connects the primary winding of the transformer 442 to the A.C. power terminals, thereby energizing the recording means.

*Recording means.*—The instructor console provides a permanent record of response from each student to a given question and an instantaneous indication of the student response to a given question and the percentage accuracy of those responding. Referring to FIG. 15, each of the plurality of recording elements advantageously comprises respective heating filaments 290 connected to a common bus 288. The other terminal of each of these heating elements is connected to its associated storage element. Thus, recording element 290a is connected to the record output lead 22a. Bus 288 is supplied with alternating current power from stepdown transformer 442 when the primary of this transformer is energized through record switch 314. As shown in FIG. 12, the record contacts are energized immediately following the response period during an automatic response and record cycle.

The permanent record provided for each student station is determined by the connection made to the record output lead at the block station. Thus, referring to FIG. 18, when an incorrect answer is selected at the student station, lead 22a is grounded since the storage relay 431 is energized. As a result, the entire voltage on the secondary of transformer 442 is applied to the heating filament 290a and a visual indication of maximum darkness permanently inscribed on the heat sensitive recording medium located proximate to the heating element in the instructor console.

If the correct answer has been selected by the student controlling student station 12a, relay 430 is actuated and lead 22a is connected to an open circuit so that no current is applied to the heating filament 290a. Therefore, no visual indication is applied to the heat sensitive recording medium.

When the student at station 12a fails to make any answer choice, neither of the relays 430 or 431 is actuated. As a result, the record output lead 22a is connected through a voltage dropping resistor 445 and normally closed relay contacts 430A to ground. Accordingly, the associated heating filament 290a is only partially energized, causing a medium dark mark on the paper. In this manner, a single stylus element associated with each student station provides a permanent record of an incorrect response, a correct response or a non-response by the student to a given question.

Figure 24:
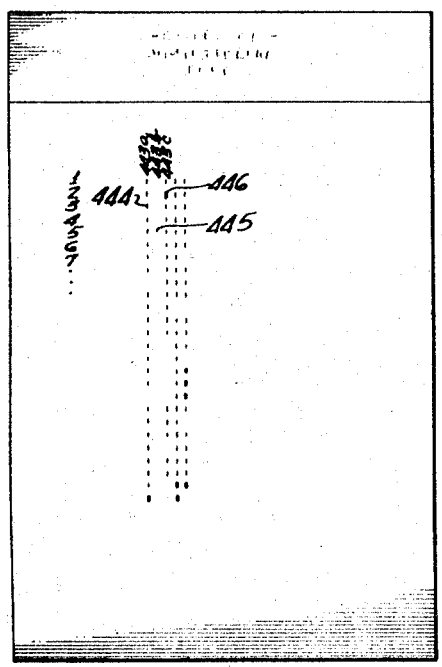
FIG. 24 is a plan view of a sheet of heat sensitive medium with the student diagnostic profiles recorded thereon.

As is shown in FIG. 24, the visual indication made on the heat sensitive sheet 174 by each heating filament 290a . . . 290n is aligned in a respective individual vertical column 443a, 443b, 443c . . . 443n while all the visual indications responsive to each question are aligned in an individual horizontal row 1, 2, 3, 4 . . . . Thus, e.g. the medium dark mark 444 in row 3 and column 443a indicates that the student controlling student station 12a made no answer choice to question number 3. On the other hand, the lack of a mark at 445 in row 5 and column 443b indicates that the student controlling student station 12b selected the correct answer response to question number 5, and the maximum darkness mark 446 in row 2 and column 443c indicates that the student controlling student station 12c selected the incorrect answer response to question number 2. Therefore, the heat sensitive sheet records a permanent diagnostic profile of the answer responses of each individual student. The profile is self-graded as the test is administered in that the instructor need only count the medium dark and heavy dark marks in a column to ascertain the number of questions to which any student gave no answer response or an incorrect answer response respectively. In addition, the instructor can readily ascertain the difficulty of any question from the profile at any time subsequent to the recording by noting the number of each type of mark in any row.

*Reset of storage elements.*—Each of the storage relays 430, 431 and each of the storage means are reset at the end of each automatic response and record period by opening the storage hold switch 318 at a time just preceeding the automatic home position (see FIG. 12). At this time, relay 410 is disconnected from bus 399, resulting in the de-energization of power buses 435 and 436 and de-actuation of all storage relays.

The automatic home position provided by cam 302 and switch 312 immediately follows the resetting of all storage relays. The system is then ready for another response and record cycle as initiated by the start button or by an automatic control device such as a slide projector, video receiver or the like.

MANUAL MODE

The manual mode is selected by actuating mode control switch 35 on the instructor console 10 to the manual select position, as shown in FIG. 15. In the manual mode, the motor shaft 244 is initially at the manual home position (FIG. 12), wherein switch 310 is disengaged by cams 300 thereby placing its movable contact in the position shown in FIG. 15. If the shaft is not immediately so positioned when switch 25 is thrown to the ON position, power is supplied to the timing motor 240 via the ON-OFF switch 25, the manual home switch 310, and stage 35c of the mode selector switch, until the manual home switch is disengaged by cam 300 to set the movable switch contact to the position shown in the figure. The instructor console is then ready for the correct answer to be inserted by the instructor.

*Answer selector means.*—The instructor inserts the correct answer into the system in the same manner as in the automatic mode described above, i.e. by rotating answer selector switch 30 to one of the five positions, A, B, C, D or E. After the answer selector switch has been actuated to select the answer from the five possible positions, the system is ready for initiating a response period.

A particular advantage of the sequence control provided by the timing cams and switches of FIG. 12 is that the manual and automatic modes are accomplished with only the addition of the mode selector switch 35. Thus, by permitting the timing motor shaft 244 to home to a manual home position angularly displaced from the automatic home position, the manual home position coincides with the response and storage hold position. As described below this permits the response period to be initiated in the manual mode without any rotation of the timing motor so that following termination of the response period, a complete cycle of the timing means may be initiated to provide for recording, storage reset and paper advance.

*Response period during manual operating mode.*—The response period is initiated when the instructor depresses the GO button 36 at the instructor console. When this switch closes, power is supplied to the relay 400 from the positive D.C. power bus 399 through level 35a of the mode selector switch, the GO button 36, level 35b of the mode selector switch, and level 35d of the mode selector switch. Relay 400 then locks up through its contacts 401a, response switch 316 (which is then closed by cam 306) and selector switch level 30b.

The remainder of the functions during the response period are identical to those during the automatic mode, each of the student stations being activated so that each student may make an answer response.

*Student station.*—During the manual mode, the student stations operate in the same manner as during the automatic mode previously described. Thus, the initial answer choice is communicated to the instructor console via the storage relays and the correct answer choice confirmed by a vibratory tactile stimulus.

*Storage elements.*—The storage elements function during the manual response mode in the same way as they operate during the automatic mode. Accordingly, referring to FIG. 18, relay 430 is used to store a correct answer from its associated student station 13a, relay 431 is used to store an incorrect answer from student station, and non-energization of both relays is used to store the information that no answer response was made at student station 13a.

*Visual readout means.*—The visual readout meters 50 and 51 function during both the response and record periods of the manual mode in the same manner as during the automatic operating mode.

*Termination of response period.*—The student response period in the manual mode is manually terminated by actuating the STOP button 37. The "stop" lamp 408 located underneath the STOP button 37 (FIG. 3) is energized upon initiation of the response period in the manual operating mode, thus indicating that the response period may be terminated by merely actuating the STOP button. Referring to FIG. 15, electrical current is supplied lamp 408 from bus 399 via stage 35a of the mode control switch 35 and relay contact 401d.

Actuation of the STOP button results in power being applied to the timing motor 240 via the ON-OFF switch 25, the STOP button 37, and stage 35c of the mode selector switch. Immediately, the manual home switch 310 is actuated by cam 300 and electrical power continues to be applied to the timing motor until the motor shaft 244 is rotated through an entire revolution and again reaches the manual home position.

As shown in FIG. 12, the response period is terminated immediately after the timing motor 240 leaves the manual home position, at which time the cam 306 causes the response period switch 316 to open. Relay 400 is then released, causing a loss of power on the five communication lines 11A, 11B, 11C, 11D and 11E. All power in each student station is then lost and the station goes dead. The storage relays, however, remain locked in the mode of the initial selection by the student and continue to memorize the correctness or lack of response of each student station and are held in position by cam 308 and hold switch 318 during the record period.

*Record period during manual operating mode.*—The record period is initiated following the response period by cam 304 and switch 14 as shown in FIG. 12. The recording means at the student station functions in the same manner as during the manual operating mode to make a permanent record for each student of an incorrect response, a correct response or a non-response to each question.

*Reset of storage elements.*—Each of the storage relays 430, 431 are reset at the end of each manual response and record period, by opening the storage hold switch 318 following the record period (see FIG. 12). At this time, relay 410 is disconnected from bus 399, resulting in the de-energization of power bus 435 and 436 and de-actuation of all storage relays.

*Recording medium advance.*—The recording medium is automatically advanced following the resetting of the storage elements in the manual operating mode. Thus, as shown in FIG. 12, the paper advance period is shown following the storage hold period after the shaft has rotated approximately 45°. The mechanism for advancing the recording medium is fully described above.

The timing motor 240 continues rotating following the paper advance until the shaft has rotated to the manual home position provided by cam 300 and switch 310. The system is then ready for another manual response period as initiated by the GO button 36.

AUTOMATED INSTRUCTIONAL PRESENTATION

Figure 19:
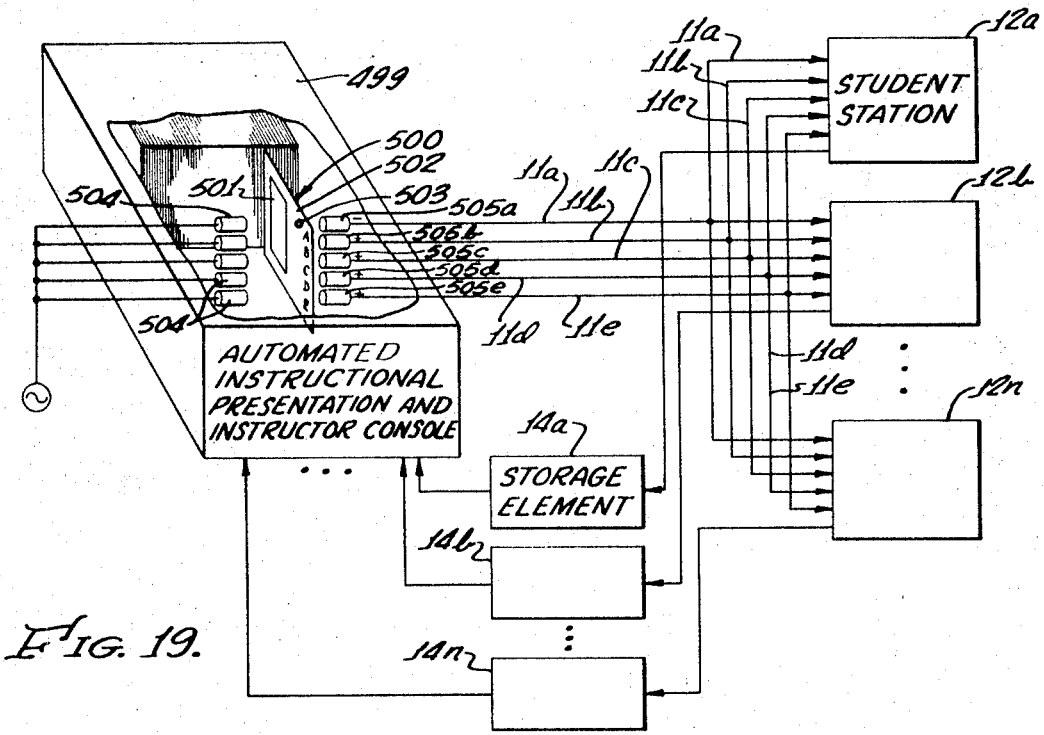
FIG. 19 is a block diagram showing the teaching system in combination with an automated instructional presentation.

An exemplary embodiment of the teaching system in combination with an automated instructional presentation console 499 is illustrated in FIG. 19. The instructional materials and questions are presented on a series of slides 500 loaded in an automatic slide projector. Each slide includes a portion 501 containing the instructional material. In addition, those slides associated with a question concerning the course material include a portion 502 on which is coded the correct answer to the question. This portion includes a series of five positions labeled A, B, C, D and E. An aperture 503 is formed in that position corresponding to the correct answer.

A decoding mechanism comprises a series of light sources 504 which respectively illuminate each of the positions A, B, C, D and E and are juxtaposed a series of photocells 505A, 505B, 505C, 505D and 505E located on the opposite side of the slide. Circuitry associated with each of the photocells provides a positive bias at their outputs except when light energy is applied to their light sensitive surface at which time a negative potential is applied at their output. Thus, as shown, the outputs of photocells 505B . . . 505E are positive whereas the aperture 503 in position A causes a negative potential to be produced at the output of photocell 505A. Each of the photoconductor output circuits are respectively connected to the five conductors 11A, 11B, 11C, 11D and 11E which are in turn connected to each of the student stations 12.

The timing and recording portions of the instructor console 499 may be identical to those described above. The system may be fully automated by employing an automatic slide projector and operatively connecting this projector to the START button of the instructor console. Accordingly, when the instructor console is in the automatic mode, a question will be presented to the class and a response period initiated thereby. The student stations are energized at this time by the potentials applied on the conductors 11A, 11B, 11C, 11D and 11E.

The remainder of the system of FIG. 19 may be the same as that described hereinabove whereby the answers from each of the student stations are temporarily stored in associated storage elements 14 and recorded and displayed at the instructor console. Thus, in the automatic mode, the student responses are automatically recorded and the system made ready for a subsequent operation of the slide changer mechanism.

In like manner, the automated instructional presentation may be a moving picture projector, a tape recorder, television receiver, or similar means for presenting an instructional program to a group of students. When used with a moving picture projector, a tape recorder, or television receiver, different tones may be encoded directly on the sound track or channel corresponding to answers to the questions presented, these tones being decoded to actuate drivers for the five-line communication leads 11a, 11b, 11c, 11d and 11e. Similarly, these tones may be used to actuate the GO button of the instructor console in its automatic mode to provide a completely self-contained teaching system. Alternatively, the instructor console can be placed in its manual mode and an additional tone encoded on the sound track being used to actuate the STOP button of the instructor console so as to terminate the response period and initiate the record and paper advance portions of the machine cycle.

COMPUTER INTEGRATION

Figure 20:
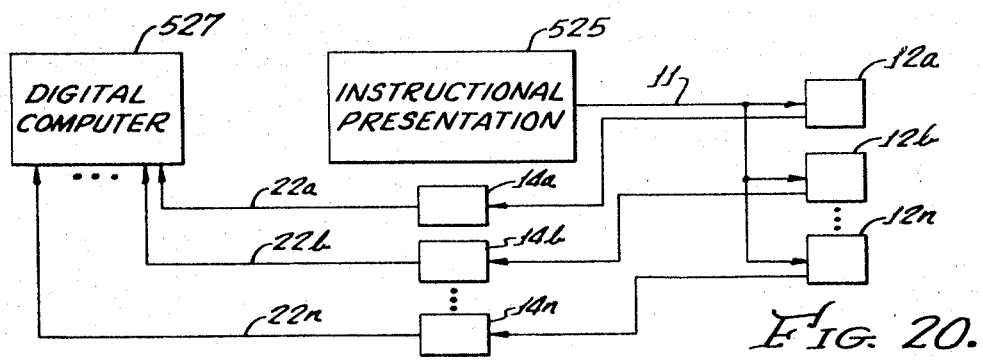
FIG. 20 is a block diagram showing the teaching system in combination with a digital computer.

The combination of a digital computer and the teaching system is shown in FIG. 20. The block 525 represents a live instructor or an automated instructional presentation which delivers questions to the group and selects answers transmitted to each of the student stations 12 over the connecting means 11 as described above. The answer responses are temporarily stored in the storage elements 14 and monitored at respective inputs 526a, 526b . . . 526n of the digital computer 527. In an exemplary embodiment, the outputs of the storage elements 14 may comprise the leads 22a, 22b . . . 22n with a ground or partial ground representing a binary zero and open circuit representing binary one. The digital computer is programmed to correlate these binary signals to maintain a diagnostic profile for each student, to continuously calculate the class understanding of each student and to give quantitative data outputs to the instructor which he may effectively utilize to vary the content of his presentation in accordance with the responses registered by the students.

Figure 21:
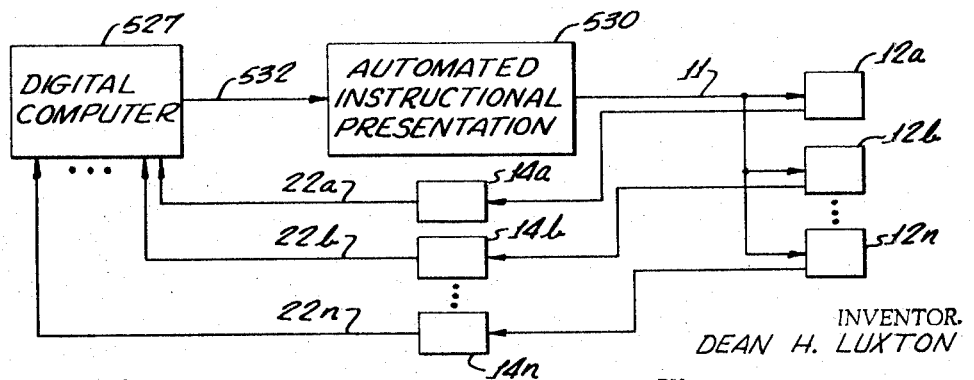
FIG. 21 is a block diagram showing a teaching system having a digital computer in a closed loop system.

An additional teaching system combined with a digital computer is illustrated in FIG. 21 including an automated instructional presentation 530 responsively coupled to the output of the digital computer 527 by information channel 532. In this system, the digital computer monitors the student responses and utilizes this information to select alternate presentation modes in an automated sequence, based on performance data for a group of students for a single question or series of questions. Accordingly, it will be seen that the system of FIG. 20 comprises a completely closed loop system which once having been programmed, can be used to teach an entire course without human intervention while providing continuous computer control of the instructional presentation to match it with the learning capacity of the student group. In addition, a complete diagnostic profile and class understanding of each student is stored in the digital computer for practically instantaneous retrieval at any time during the course.

In a specific embodiment involving the automated instructional presentation of FIG. 19, the sequence of each of the slides 500 is varied by the output of computer 527 over control lead 532 to present additional instructional material showing additional slides or by decreasing the instructional material by skipping certain of the slides in accordance with the performance of the student group as monitored by the computer inputs 526a, 526b . . . 526n.

Figure 22:
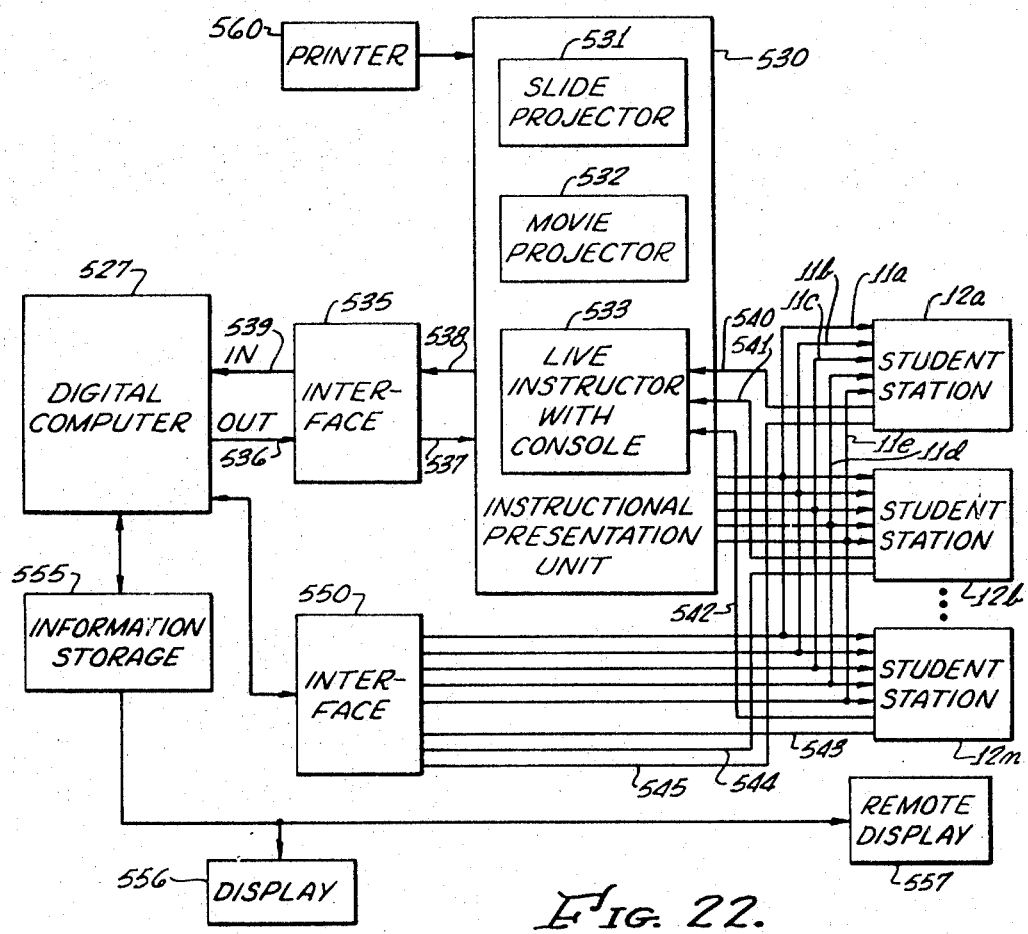
FIG. 22 is a block diagram showing another embodiment of the teaching system integrated with a digital computer.

A more detailed embodiment of a computer integrated system is illustrated in FIG. 22. As shown, the instructional presentation unit 530 includes both automated instructional tools such as a slide projector 531, a movie projector 532, and the live instructor controlling the instructor console 533. Data is both received and communicated to the digital computer 527 from the instructional presentation unit 530 via an interface 535 which converts the computer data on lead 536 into data on lead 537 which is understood by the instructional presentation unit and likewise converts the output data from the instructional presentation unit on lead 538 to that understood by the computer on lead 539.

The answer, as selected by the instructional presentation unit 530, is communicated to each of the student stations, 12a, 12b . . . 12n via the respective leads 11a, 11b, 11c, 11d and 11e in the manner described hereinabove. Each of the student stations transmits information to the instructor console via the respective lines 540, 541 and 542. In addition, each of the student stations has a direct line of communication with the digital computer via respective leads 543, 544 and 545 connected to the digital computer via an interface 550 which translates the data into a form compatible with the computer. The digital computer includes an information storage 555 having a local display 556 and one or more remote displays 557. A printer 559 advantageously constructed as described above and particularly illustrated in FIGS. 8, 9 and 10 is coupled to the instructional presentation for providing a permanent record of the student response.

Figure 23:
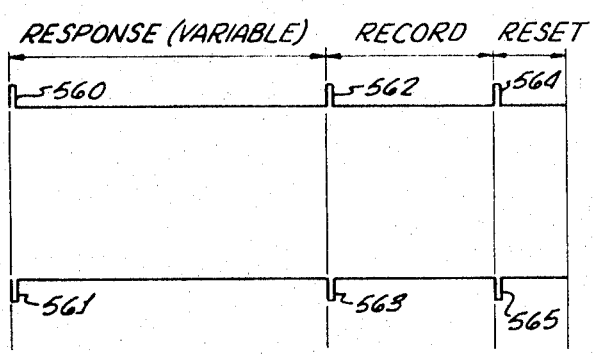
FIG. 23 illustrates the type of control signals used in the system of FIG. 22.

FIG. 23 illustrates the control and feedback signals provided by the digital computer or received by it for controlling some of the basic functions of the teaching system. Thus, the computer initiates the response period by a pulse 560 transmitted from the computer 527 to the instructional presentation unit 530. Upon initiation of the response period, the instructional presentation unit transmits via lead 538 feedback data 561 for confirming that the response period has been initiated. After the response period, which may be for any time period as determined by the program of the digital computer, a control data pulse 562 is transmitted via lead 536, interface 535 and lead 537 to the instructional presentation to terminate the response period and initiate the record period. At this time, the printer 559 is energized for permanently recording the student responses. Such energization provides a feedback pulse 563 to the computer for confirming that the recording sequence has been initiated. After a preset time interval sufficient for recording the data, the computer produces a reset control data pulse 564 to the instructional presentation unit 530 for terminating the record period and preparing the machine for a succeeding response period. This reset is likewise confirmed by the pulse 565 from the instructional presentation unit to the digital computer 527.

In the system of FIG. 22, the computer receives from the student stations the following information: (i) the summed or integrated information corresponding to the percentage of students responding and the percentage of students responding correctly; (ii) an unintegrated signal from each student station corresponding to the correctness of each student response; and (iii) an unintegrated signal from each student station corresponding to whether or not a response was made at that particular student station. The computer further receives from the instructor console information concerning the instructor's teaching plan, i.e. his course of events and decisions made by him. The program computer continuously transmits to the instructor console up-to-date statistical information concerning the performance of the class and suggestions to the instructor based on the past performance of the class as to the manner in which the instructional program should proceed for most effectively delivering the instructional material to the group.

The direct line of communication provided by leads 543, 544 and 545 from each student station to the digital computer 527 enables an advanced degree of flexibility since additional communication channels are made available. For example, each student station may be equipped with additional selector means whereby the student may communicate certain additional information to the computer such as an opinion that the material presented is too difficult or too elementary or that the material presented is uninteresting or boring, etc. In this manner, the computer-assisted instruction can continuously up-grade the instructional presentation by accumulating this information and presenting it to the instructor in a statistical manner.

Although a number of general purpose computers may be programmed to serve the function of the digital computer 527, computers particularly adapted for these modes of operation are the models 1401 and 360 digital computer manufactured by I.B.M.

SUMMARY

The teaching system of this invention provides each individual student with immediate answer confirmation and the ability to determine the correct answer during the available response period. This information is privately conveyed to the student by a pleasant tactile stimulus which serves both to confirm his answer response and also to serve as a reinforcer. In addition, information is immediately available to the instructor regarding the class performance so that the instructor will have continuous knowledge of the interest of his student group and their grasp of the material presented. As such, a complete learner-oriented system is implemented, whether in a fully automated mode or with a live instructor to provide maximum learning efficiency.

I claim:
1. A teaching system comprising:
   instructor means for indicating a correct one of a plurality of possible answers to a question presented to a group of students;
   a plurality of student stations each having student response means for a student to select one of the plurality of possible answers to the question;
   comparator means responsive to the instructor means and to the student response means for comparing the answer selected by each student with the answer indicated by the instructor means; and
   means at each of said student stations responsive to said comparator means for providing a positive reinforcing, private, inaudible, invisible, tactile stimulus to the student if the student response means at that station has been operated to select the answer corresponding to the answer indicated at the instructor means.
2. The teaching system described in claim 1, wherein said means for providing a tactual sensation comprises a vibrator perceived only by the responding student's tactile sense.
3. A teaching system in accordance with claim 1 wherein the plural student response means further comprises:
   selector switch means at each of the plural student response means for selecting an answer response; and
   a response switch independent of the selector switch means operable after the selector switch means is positioned to the selected answer response to communicate the selected response to the comparator means.
4. A teaching system in accordance with claim 1 in combination with:
   an instructional unit for providing an automated presentation or a presentation controlled by a live instructor for presenting a series of questions to a group of students and indicating a correct one of a plurality of possible answers to each question, each of the students receiving the same questions at the same time;
   a digital computer;
   means for transmitting data between the digital computer, said instructional unit, and each of said student response means, said computer being programmed to statistically correlate the results of the student answer selections; and
   means responsive to the statistical correlation by the computer for controlling said instructional presentation unit or advising the live instructor to vary the series of questions presented to the group of students in accordance with the statistical correlation.
5. The teaching system in combination with a digital computer as described in claim 4 comprising
   means for recording data corresponding to the correctness of the student answer responses to provide a historical profile of each student's response participation.
6. The teaching system in combination with a digital computer as described in claim 4 wherein
   said digital computer comprises means for producing control signals for initiating a response period for activating said student response means, for initiating a record period for activating said recorder, and for resetting said system preparatory to a succeeding response period, said teaching system further including means for feeding back signals to the computer indicating initiation of the response period, the record period and reset, respectively.

7. A teaching system comprising:

instructor means for indicating a correct one of a plurality of possible answers to a question presented to a group of students;

a plurality of student stations each having student response means for a student to select one of the plurality of possible answers to the question;

comparator means responsive to the instructor means and to the student response means for comparing the answer selected by each student with the answer indicated by the instructor means; and recording means responsive to said comparator means for permanently recording at a central location individually for each station whether the student response means at that station was operated to select an answer, and whether the answer selected corresponded to the answer selected at the instructor means.

8. A teaching system in accordance with claim 7 and further comprising:

storage means responsive to said comparator means for temporarily storing the correctness of the initial answer choice, said recording means being responsive to said storage means for recording the event of answer choice selection and the correctness of the initial answer choice; and means for providing a private stimulus to the student indicative of the correctness of his answer choice, said means being operable both during and after the initial answer choice to enable the student to inform himself of the answer selected by the instructor means.

9. A teaching system in accordance with claim 7 wherein said recording means records a diagnostic profile of each student's answer responses on a sheet medium, the profile being privately visible to the instructor as the questioning progresses, the profile having rows each representing a different question and columns each representing the responses of a different student.

10. The teaching system of claim 9 wherein said instructor means includes a mode control switch for selecting either a manual or automatic operational mode, said automatic mode energizes a timing means for providing a predetermined response period for energizing said student means, and said manual mode provides a response period of arbitrary length as determined by the instructor.

11. A teaching system comprising:

instructor means having a plural output signal means for respectively communicating plural alternate answers to multiple choice questions presented to the group to indicate a correct one of a plurality of possible answers to a question presented to a group of students;

a plurality of student stations each having a student response means including a continuously rotatable switch having spaced stationary contacts respectively connected to the output signal means of said instructor means and a movable contact which engages each of said output signal means during each complete revolution of said rotary switch for a student to select one of the plurality of possible answers to the question; and comparator means responsive to the instructor means and to the student response means for comparing the answer selected by each student with the answer indicated by the instructor means.

12. In a teaching system having instructor means for indicating a correct one of a plurality of possible answers to a question presented to a group of students, a plurality of student stations each having student response means for a student to select one of the plurality of possible answers to the question, and comparator means responsive to the instructor means and to the student resposne means for comparing the answer selected by each student with the answer indicated by the instructor means, recording means responsive to said comparator means for permanently recording each student's response comprising:

a plurality of spaced-apart stationary electrical elements each associated with an individual one of the student stations;

means for selectively advancing a sensitive medium across said electrical elements;

means responsive to the comparator means for selectively energizing said spaced-apart electrical means to record the correctness of the answer response of the student at the associated student station on the sensitive medium while said electrical means remains stationary.

13. In a teaching machine having a plurality of student stations, the response recording means of claim 12 further comprising control means to operate said advancing means and said electrical means alternatively.

14. In a teaching machine having a plurality of student stations, means for recording answer responses selected by the students responsive to multiple choice questions in accordance with claim 12 wherein said spaced-apart electrical means compirse respective electrical heating elements, each heating element being associated with an individual one of the student stations and wherein said means for selectively energizing said spaced-apart electrical means provide selective heating of each heating element responsive to the correctness of the answer response to the student at the associated student station.

15. In a teaching machine having a plurality of student stations, means for recording answer responses selected by the students responsive to multiple choice questions in accordance with claim 14 wherein the means for selectively heating each element includes means for selecting one of three conditions (i) relatively low temperature heat (ii) relatively high temperature heat and (iii) no heat, in accordance with whether the student at the associated station selected no answer response, a correct answer response, or an incorrect response.

16. In a teaching system including instructor means for indicating a correct one of a plurality of possible answers to a question presented to a group of students and a plurality of student stations, student response means for said student stations comprising:

selecting means operable by a student for privately selecting any one of a plurality of alternate answer responses to the question;

comparator means responsive to the instructor means and to said selecting means for comparing the answer selected by the student with the answer indicated by the instructor means;

means responsive to said comparator means for sending an output signal in accordance with the correctness of the answer response selected by the student; and means responsive to an input signal from the instructor means for providing a positive reinforcing, private, inaudible, invisible, tactile stimulus to the student if the selecting means at that station has been operated to select the answer corresponding to the answer indicated at the instructor means.

17. The student response of claim 16 wherein the means for sending an output signal in accordance with the answer response includes a continuously rotatable switch having plural sets of gauged stationary contacts, and a movable contact which engages each of said stationary contacts during each complete revolution of the rotatable switch.

18. The student response means of claim 17 wherein the student response means includes a housing having an opening at the top,
the means for selecting an answer response includes a selector disc covering said opening and mounted for rotation to any of a plurality of positions in accordance with the answer response selected, indicia on the selector disc representing the various alternate answer responses, and a light source interior of the housing visible through the disc at that indicia representing the selected answer response.

19. The student response means of claim 18 wherein a shade narrows the perception angle of the light source to shield it from other students,
a switch on the student response means is operable by the student to complete any of a plurality of circuits in accordance with the answer response selected, and
the means responsive to an input signal includes a coil mounted on the student response means to vibrate the housing if the answer response selected at the student station is correct.

20. A teaching system comprising:
instructor means for indicating a correct one of a plurality of possible answers to a question presented to a group of students;
a plurality of student stations each having student response means for a student to select one of the plurality of possible answers to the question;
comparator means responsive to the instructor means and to the student response means for comparing the answer selected by each student with the answer indicated by the instructor means;
means for recording the correctness of each student's response;
timing means for providing an operating cycle divided into a response period followed by a record period;
a mode control switch for selecting either a manual operational mode having a response period of arbitrary length as determined by the instructor, or an automatic operational mode having a predetermined response period;
said timing means including means initiating the operating cycle in said manual mode during the response period at a point just prior to the record period and terminating the operating cycle at the same point; and
said timing means including means initiating the operating cycle in the automatic mode before said response period and terminating the operating cycle after said record period.

21. The teaching system of claim 20 wherein said timing means comprises:
response switch means for energizing the student means, record switch means for energizing the recording means,
switch means for selectively energizing the timing motor,
a response cam cycled by the timing motor for operating the response switch means, the response cam being divided into a response segment and a no-response segment,
a recording cam cycled by the timing motor for operating a recording switch means, the recording cam being divided into a recording segment effective during the no-response portion of the cycle, and a no-record segment effective during the response portion of the cycle,
an automatic mode cam cycled by the timing motor for operating the timing switch means, the automatic cam having a home position in which the timing motor is de-energized, said home position occuring before the response period and after the record period, and
a manual mode cam cycled by the timing motor for operating the timing switch means and having a home position in which the timing motor is de-energized, the manual home position being effective during the response period at a point just prior to the record period.

22. A teaching system comprising:
instructor means for indicating a correct one of a plurality of possible answers to a question presented to a group of students;
a plurality of student stations each having student response means for a student to select one of the plurality of possible answers to the question;
comparator means responsive to the instructor means and to the student response means for comparing the answer selected by each student with the answer indicated by the instructor means, said comparator means including plural conductors connecting the instructor means to each student response means, each conductor representing a different one of the alternate answer responses, and
means for supplying a first output signal from the instructor means to one of said conductors representing the correct answer, and a mutually exclusive second output signal from the instructor means to each of the remainder of said conductors representing each of the incorrect answers; and
means at each of the student stations responsive to the coincidence and noncoincidence of the student's answer response and the correct answer as communicated from said instructor means for providing a stimulus to the student indicative of whether the student response means at that station had been operated to select the answer corresponding to the answer indicated at the instructor means.

23. The teaching system of claim 22 wherein:
said mutually exclusive signals comprise a first direct current of one polarity and the other of said signals comprises a direct current of the opposite polarity.

24. The teaching system of claim 22 wherein:
said instructor means enables selection of N alternate answers to multiple choice questions presented to a group, and
the means for communicating the selected one of said N answers to said student means comprises only N electrical conductors representing the alternate answers plus a ground.

25. The teaching system described in claim 22 including
means for demarcating a predetermined response period, and
means responsively connected to said last named means for energizing said output signal means during said response period.

26. The teaching system of claim 22 wherein each of said student response means includes:
means responsive to the coincidence and non-coincidence of the student's answer response and the correct answer as communicated from said instructor means and providing mutually exclusive output signals according to a coincident or non-coincident condition,
said means including a switch at each of said student response means having a movable contact for selectively engaging one of said conductors so as to apply mutually exclusive signals to said movable contact corresponding to the correctness or incorrectness of the student answer response.

27. The teaching system of claim 26 further comprising means responsive to the mutually exclusive output signals of said switch for energizing said means for providing the private stimulus, said means providing a closed signal path for the signal corresponding to the correct answer and an open signal path for said signal corresponding to the incorrect answer.

28. The teaching system of claim 22 comprising storage means responsive to the output signal of said student means for temporarily storing the correctness of said answer choice, and means responsive to said storage means for communicating the correctness of the initial student responses to said instructor means.

29. The teaching system of claim 28, wherein said storage means comprises
a first storage device responsive only to an initial correct answer choice, and
a second storage device responsive only to an initial incorrect answer response.

30. The teaching system of claim 29, wherein
each of said student response means provides mutually exclusive output signals respectively corresponding to correct and incorrect answer responses, and
said first storage device comprises
first storage means responsive to only one of said signals,
second storage means responsive to only the other of said output signals, and
means for inhibiting actuation of said storage means following the initial student response.

31. The teaching system of claim 22 further comprising
storage means coupled to said student means for temporarily storing an initial correct answer choice,
means coupled to said storage means for determining the percentage of students answering a question correctly on their initial answer response.

32. The teaching system of claim 22 comprising
first storage means coupled to said student means for temporarily storing an initial correct answer choice,
second storage means coupled to said student means for temporarily storing an initial incorrect answer choice,
means coupled to said first storage means for determining the percentage of students answering a question correctly on their initial answer response,
means coupled to both said first and second storage means for determining the percentage of students making an answer choice.

33. The teaching system of claim 22 further comprising
storage means coupled to each of said student response means for temporarily storing initial correct or incorrect answer choices,
means coupled to said storage means for supplying electrical signals corresponding to the correctness of the answer choices, and
a sheet medium responsive to the electrical signals provided by said means for making a permanent record of the correctness of the student answer choices.

34. The teaching system of claim 22 including
control means for demarcating a predetermined response period followed by a record period,
means responsively connected to said control means for energizing said student means during said response period,
storage means for temporarily storing the correctness of the student's initial response,
means coupled to said storage means for recording the correctness of the student's response, and
means responsive to said control means for resetting said storage means after said record period.

35. In a teaching system having a plurality of student stations, means for recording answer responses selected by the students responsive to multiple choice questions comprising:
a plurality of spaced-apart electrical means;
means for selectively advancing a sensitive medium across said electrical means including:
an elongate retaining member mounted over the heating elements to hold a sheet of sensitive medium adjacent the spaced-apart electrical means, said retaining member having an elongate slot in its underside into which the spaced-apart electrical means extend without contacting the retaining member;
at least one rotatable wheel mounted beneath the retaining member with the upper portion of its periphery adjacent the retaining member to grip a sheet therebetween, and
ratchet means for rotating the wheel in one direction a predetermined amount each time the ratchet means is actuated; and
means responsive to the student answer responses for selectively energizing said spaced-apart electrical means to record the answer responses on the sensitive medium.

36. In a teaching machine having a plurality of student stations, the response recording means of claim 35 wherein the retaining member includes rotatable means cooperating with the wheel to grip the sheet.

37. In a teaching machine having a plurality of student stations, the response recording means of claim 36 wherein the means rotatably mounting the wheel includes
an elongate axle, and
means resiliently supporting both ends of the axle and urging the wheel into contact with the retaining member.

38. A teaching system comprising:
instructor means for selecting alternate answers to questions presented to a group of students; and
plural student response means for privately selecting alternate answer responses, each of said student response means having means responsive to the student response and the answer related by said instructor means for providing a private sensory stimulus to the student confirmatory of the correctness of his answer response;
said instructor means including plural output signal means for communicating the correct answer to each of said student response stations, means for supplying mutually exclusive signals to said output signal means so that one of said signals represents the correct answer and the other of said signals represents each of the incorrect answers, means for demarcating a predetermined response period, means responsively connected to said last named means for energizing said output signal means during said response period, and means for automatically terminating said response period if an alternate answer is selected at the instructor means during said response period.

39. A teaching system comprising:
instructor means for selecting alternate answers to questions presented to a group of students;
plural student response means for privately selecting alternate answer responses, each of said student response means having means responsive to the student response and the answer related by said instructor means for providing a private sensory stimulus to the student confirmatory of the correctness of his answer response;
each of said student response means including means responsive to the coincidence and non-coincidence of the student's answer response and the correct answer as communicated from said instructor means and providing mutually exclusive output signals according to a coincident or non-coincident condition, said means including a switch at each of said student response means having a movable contact for selectively engaging one of said signal means so as to apply mutually exclusive signals to said movable contact corresponding to the correctness or incorrectness of the student answer response;
means responsive to the mutually exclusive output signals of said switch for energizing said means for providing the private tactile stimulus, said means providing a closed signal path for the signal corresponding to the correct answer and an open signal path for said signal corresponding to the incorrect answer;

said mutually exclusive output signals on said instructor output means comprising respective opposite polarity electrical signals; and said means for providing said closed and open signal paths comprising a first diode poled so as to be forwardly biased by the signal representing the correct answer and reverse biased by the signal representing the incorrect answers.

40. A teaching system comprising:

instructor means for selecting alternate answers to questions presented to a group of students, and plural student response means for privately selecting alternate answer responses, each of said student response means having means responsive to the student response and the answer related by said instructor means for providing a private sensory stimulus to the student confirmatory of the correctness of his answer response, each of said student response means providing an output signal corresponding to the correctness of the student's answer response;

storage means responsive to the output signal of said student means for temporarily storing the correctness of said answer choice, including a first storage device responsive only to an initial correct answer choice, and a second storage device responsive only to an initial incorrect answer response;

means responsive to said storage means for communicating the correctness of the initial student responses to said instructor means;

each of said student response means providing mutually exclusive first and second output signals of opposite polarity respectively coresponding to correct and incorrect answer responses, said system further including;

first and second unidirectional conducting means connected between said first and second output signals and said first storage device, said first unidirectional conducting means poled so as to be forwardly biased by said first signal and reverse biased by said second signal and said second unidirectional conductive means being connected between said first and second output signals and said second storage device and poled so as to be forwardly biased by said second signal and reverse biased by said first signal.

41. A teaching system comprising:

instructor means for selecting alternate answers to questions presented to a group of students;

plural student response means for privately selecting alternate answer responses, each of said student response means having responsive to the student response and the answer related by said instructor means for providing a private sensory stimulus to the student confirmatory of the correctness of his answer response;

first storage means coupled to each of said student response means for temporarily storing an initial correct answer choice;

second storage means coupled to each of said student response means for temporarily storing an initial incorrect answer choice;

means for recording that (i) a student has made a response and (ii) the correctness of said response comprising an electrical heating element, means for supporting a heat responsive medium, means for connecting said electrical heating element to both of said first and second storage elements so that (i) a first level of current flow is provided when said second storage means is energized to record a mark of predetermined darkness on said medium, (ii) a second level of current flow is provided when neither said first or second storage means are actuated to record a marking having a different degree of darkness on said medium, and (iii) a current flow insufficient to make a mark flows when said first storage means is energized.

42. In a teaching system having a plurality of student stations, means for recording answer responses selected by the students responsive to multiple choice questions comprising:

a plurality of spaced-apart electrical means;

means mounting said heating elements on a support member including;

an elongate body of thermal and electrical insulation material having one longitudinal edge across which each element extends, the elements being spaced along the length of that edge, and resilient means supporting the elongate body from the support member with said one longitudinal edge extending across the path of the heat sensitive medium, said resilient means urging the heating elements into contact with a sheet of heat sensitive medium;

means for selectively advancing a sensitive medium across said electrical means; and means responsive to the student answer responses for selectively energizing said spaced-apart electrical means to record the answer responses on the sensitive medium.

43. In a teaching system having a plurality of student stations, means for recording answer responses selected by the students responsive to multiple choice questions comprising:

a plurality of spaced-apart electrical means;

a support member having a flat surface for supporting a sheet of the sensitive medium on which the record is to be made;

an elongate retaining member mounted on the support member over the spaced-apart electrical means to hold the sheet adjacent said means;

magnetic means on said retaining member and said support member for exerting a magnetomotive force to urge said retaining member toward a gripping position adjacent the support surface;

resilient means operatively connected between said support member and said retaining member for exerting an opposing force to urge said retaining member toward a release position, said magnetomotive force exceeding said opposing force when the retaining member is in the gripping position and said opposing force exceeding said magnetomotive force when the retaining member is in the release position;

means for selectively advancing a sensitive medium across said electrical means; and means responses to the student answer responses for selectively energizing said spaced-apart electrical means to record the answer responses on the sensitive medium.

References Cited

UNITED STATES PATENTS

| | | | |
|---|---|---|---|
| 2,644,738 | 7/1953 | Gardner | 346—76 |
| 2,738,595 | 3/1956 | John et al. | 35—48 |
| 2,918,555 | 12/1959 | Lindberg | 200—167 |
| 3,082,545 | 3/1963 | Kiker | 35—9 |
| 3,186,109 | 6/1965 | Brinton | 35—9 |
| 3,188,951 | 6/1965 | Hollerith | 101—382 |
| 3,230,321 | 1/1966 | McCann | 200—167 X |
| 3,260,830 | 7/1966 | Albright | 200—167 |
| 3,300,876 | 1/1967 | Johannsen | 35—9 |
| 3,314,172 | 4/1967 | Boyett | 35—9 |
| 3,327,312 | 6/1967 | Hamilton et al. | 346—76 X |

OTHER REFERENCES

IBM Tech. Info., Siegel, Mar. 31, 1966, 10 pages.

EUGENE R. CAPOZIO, Primary Examiner

WALTER W. NIELSEN, Assistant Examiner